(12) United States Patent
Jun et al.

(10) Patent No.: US 11,616,868 B2
(45) Date of Patent: Mar. 28, 2023

(54) CAMERA MODULE WITH FIXED AND MOVABLE CAMERAS AND PORTABLE ELECTRONIC DEVICE INCLUDING THE SAME

(71) Applicant: SAMSUNG ELECTRO-MECHANICS CO., LTD., Suwon-si (KR)

(72) Inventors: Jae Woo Jun, Suwon-si (KR); Chul Choi, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 267 days.

(21) Appl. No.: 17/076,114

(22) Filed: Oct. 21, 2020

(65) Prior Publication Data

US 2021/0337050 A1     Oct. 28, 2021

(30) Foreign Application Priority Data

Apr. 24, 2020  (KR) .................. 10-2020-0050171

(51) Int. Cl.
*H04N 5/335*     (2011.01)
*H04M 1/02*      (2006.01)
*G03B 17/12*     (2021.01)

(52) U.S. Cl.
CPC .......... *H04M 1/0264* (2013.01); *G03B 17/12* (2013.01); *H04M 2250/20* (2013.01)

(58) Field of Classification Search
CPC .............................................. H04M 2250/20
See application file for complete search history.

(56) References Cited

U.S. PATENT DOCUMENTS

| 5,949,477 A * | 9/1999 | Hoglin ................. H04N 13/239 348/42 |
| 6,804,460 B1 | 10/2004 | Oshima et al. |
| 9,442,363 B2 * | 9/2016 | Seo ........................ G03B 17/14 |
| 9,743,067 B2 * | 8/2017 | Geris ................... H04N 13/296 |
| 10,979,652 B1 * | 4/2021 | Jun ....................... H04N 5/2254 |
| 2008/0225129 A1 * | 9/2008 | Viinikanoja ......... H04N 13/239 382/154 |

(Continued)

FOREIGN PATENT DOCUMENTS

| CN | 202488510 U | 10/2012 |
| CN | 202666632 U | 1/2013 |

(Continued)

OTHER PUBLICATIONS

Office Action dated Dec. 10, 2020 in the corresponding Korean Patent Application No. 10-2020-0050171 (7 pages in English)(5 pages in Korean).

(Continued)

*Primary Examiner* — Gary C Vieaux
(74) *Attorney, Agent, or Firm* — NSIP Law

(57) ABSTRACT

A camera module device includes: a base plate; one or more cameras fixed to and disposed on one surface of the base plate; a plurality of movable cameras movably disposed on the one surface of the base plate and configured to move individually or collectively; a driving gear disposed on the base plate; and a plurality of sub-gears engaged with the driving gear, wherein positions of the plurality of sub-gears are configured to change to selectively transfer power to one or more of the plurality of movable cameras.

20 Claims, 49 Drawing Sheets

(56) References Cited

U.S. PATENT DOCUMENTS

| | | | | |
|---|---|---|---|---|
| 2010/0194860 A1* | 8/2010 | Mentz | .................. | H04N 5/2252 348/47 |
| 2011/0157377 A1* | 6/2011 | Chang | .................... | G02B 30/27 348/207.99 |
| 2015/0181006 A1 | 6/2015 | Li | | |
| 2017/0026634 A1 | 1/2017 | Mirlay | | |
| 2020/0304614 A1 | 9/2020 | Li et al. | | |
| 2021/0243288 A1 | 8/2021 | Jun et al. | | |
| 2021/0405505 A1* | 12/2021 | Jun | .......................... | G03B 9/02 |

FOREIGN PATENT DOCUMENTS

| | | |
|---|---|---|
| CN | 105340386 A | 2/2016 |
| CN | 106575072 A | 4/2017 |
| CN | 206608520 U | 11/2017 |
| CN | 107734214 A | 2/2018 |
| CN | 108810367 A | 11/2018 |
| CN | 108900737 A | 11/2018 |
| CN | 109854365 A | 6/2019 |
| CN | 110985609 A | 4/2020 |
| CN | 212727177 U | 3/2021 |
| CN | 214504104 U | 10/2021 |
| JP | 2002-139774 A | 5/2002 |
| JP | 2010-245831 A | 10/2010 |
| JP | 2010245831 A * | 10/2010 |
| KR | 10-2006-0073745 A | 6/2006 |
| KR | 10-2013-0106162 A | 9/2013 |
| KR | 10-2019-0038756 A | 4/2019 |

OTHER PUBLICATIONS

Chinese Office Action dated Jun. 16, 2021 in counterpart Chinese Patent Application No. 202023164929.8 (1 page in English, 1 pages in Chinese).

Chinese Office Action dated Aug. 31, 2022, in counterpart Chinese Patent Application No. 202011549199.5 (11 pages in English and 12 pages in Chinese).

* cited by examiner

CAMERA MODULE WITH FIXED AND MOVABLE CAMERAS AND PORTABLE ELECTRONIC DEVICE INCLUDING THE SAME

CROSS-REFERENCE TO RELATED APPLICATIONS

This application claims the benefit under 35 USC § 119(a) of Korean Patent Application No. 10-2020-0050171 filed on Apr. 24, 2020 in the Korean Intellectual Property Office, the entire disclosure of which is incorporated herein by reference for all purposes.

BACKGROUND

1. Field

The following description relates to a camera module and a portable electronic device including the same.

2. Description of Related Art

A camera may be employed in portable electronic devices such as a smartphone, a tablet PC, a laptop, and the like.

Furthermore, to obtain various effects that are difficult to implement with a single camera, a plurality of cameras, rather than a single camera, may be disposed in a portable electronic device.

However, when positions of the plurality of cameras are generally fixed, there may be limitations in implementing various effects, such as when the plurality of cameras are arranged in a portable electronic device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module device includes: a base plate; one or more cameras fixed to and disposed on one surface of the base plate; a plurality of movable cameras movably disposed on the one surface of the base plate and configured to move individually or collectively; a driving gear disposed on the base plate; and a plurality of sub-gears engaged with the driving gear, wherein positions of the plurality of sub-gears are configured to change to selectively transfer power to one or more of the plurality of movable cameras.

The plurality of movable cameras may be configured to move between an initial position and a moving position, the initial position may be a position in which centers of the one or more fixed cameras and the plurality of movable cameras are disposed linearly, and the moving position may be a position in which a line connecting the centers of the one or more fixed cameras and the plurality of movable cameras forms a triangular shape or a rectangular shape.

The one or more fixed cameras may include a first camera and a second camera, the plurality of movable cameras may include a third camera and a fourth camera, the third camera may be connected to the first camera by a first link member and is configured to rotate, the fourth camera may be connected to the second camera by a second link member and is configured to rotate, and a spur gear may be engaged with the second link member.

The third camera may be configured to rotate about the first camera and the fourth camera may be configured to rotate about the second camera.

The device may include a first moving gear rotatably provided on the base plate, wherein the plurality of sub-gears may be mounted on the first moving gear, the plurality of sub-gears may include a first sub-gear, a second sub-gear, and a third sub-gear spaced apart from one another in a circumferential direction of the first moving gear, and at least one of the first to third sub-gears may be engaged with at least one of the first link member and the spur gear.

The first to third sub-gears may be configured to move to a first position, a second position, and a third position, in response to the first to third sub-gears being disposed in either one of the first position and the second position, one of the third camera and the fourth camera may be configured to move, and in response to the first to third sub-gears being disposed in the third position, both of the third camera and the fourth camera may be configured to move.

The first position may be a position in which the first sub-gear is disposed to be engaged with one side of the first link member, the second position may be a position in which the second sub-gear is disposed to be engaged with the spur gear, and the third position may be a position in which the second sub-gear is disposed to be engaged with the one side of the first link member and the third sub-gear is disposed to be engaged with the spur gear.

The device may include a first driver and a second driver provided on the base plate, wherein a rotating shaft of the first driver may be engaged with the driving gear, a rotating shaft of the second driver may be engaged with a second moving gear, and the second moving gear may be engaged with the first moving gear.

The device may include a receiving hole penetrating and provided in the base plate, wherein the driving gear may be disposed in the receiving hole to protrude to both sides of the receiving hole, the driving gear protruding to one side of the receiving hole may be engaged with the rotating shaft of the first driver, and the driving gear protruding to another side of the receiving hole may be engaged with the first to third sub-gears.

Each of the first to third sub-gears and the spur gear may include a sawtooth portion and an arc portion.

The first to third sub-gears may be configured to rotate to release an engaged state between the respective sawtooth portion and either of the first link member and the spur gear before positions of the first to third sub-gears move by the first moving gear.

The base plate may include a plurality of guide holes penetrating the base plate and each having a rounded shape, and each of the third camera and the fourth camera may include a protrusion disposed in a corresponding one of the guide holes.

The base plate may include a plurality of guide rails spaced apart from the plurality of guide holes and each having a rounded shape, and each of the third camera and the fourth camera may include a guide protrusion disposed in a corresponding one of the guide rails.

Curvatures of the plurality of guide holes may be difference from curvatures of the plurality of guide rails.

The device may include: a first elastic member connected to the first link member and configured to move the third camera from a moving position to an initial position in response to the transferred power being removed; and a second elastic member connected to the second link member and configured to move the fourth camera from the moving position to the initial position in response to the transferred power being removed.

The device may include: a case and a cover coupled to each other and forming an internal space; and a module disposed in the internal space and comprising the base plate, the one or more fixed cameras, the plurality of movable cameras, the driving gear, and the plurality of sub-gears.

In another general aspect, a portable electronic device includes: a case and a cover coupled to each other and forming an internal space; and a camera module disposed in the internal space, and comprising: a base plate; a first camera and a second camera fixed to and disposed on the base plate; and a third camera and a fourth camera disposed on the base plate and configured to move individually or collectively, wherein the base plate may include a driving gear, and a plurality of sub-gears engaged with the driving gear and configured to transfer power to either one or both of the third and fourth cameras, and wherein positions of the plurality of sub-gears may be configured to change according to a camera to be moved among the third and fourth cameras.

The device may include: an infrared cut filter provided on a portion of the cover corresponding to the first to fourth cameras in an initial position; and an infrared pass filter provided on a portion the cover corresponding to the third and fourth cameras in a moving position, wherein the initial position may be a position in which centers of the first to fourth cameras are disposed linearly, and the moving position may be a position in which a line connecting centers of adjacent cameras forms a triangular shape or a rectangular shape.

The device may include a plurality of stops are provided on the cover, wherein the plurality of stops correspond to the first to fourth cameras and have different diameters in an initial position, diameters of the plurality of stops corresponding to the third and fourth cameras in a moving position are different from the diameters of the plurality of stops in the initial position, and the initial position is a position in which centers of the first to fourth cameras are disposed linearly, and the moving position is a position in which a line connecting centers of adjacent cameras forms a triangular shape or a rectangular shape.

In another general aspect, a camera module device includes: a base plate; a plurality of movable cameras disposed on the base plate; and a plurality of sub-gears configured to selectively transfer power to one or more of the movable cameras, based on positions of the sub-gears, wherein the movable cameras may be configured to move from an initial position to a moving position, in response to receiving the transferred power.

Other features and aspects will be apparent from the following detailed description, the drawings, and the claims.

Figure 1:
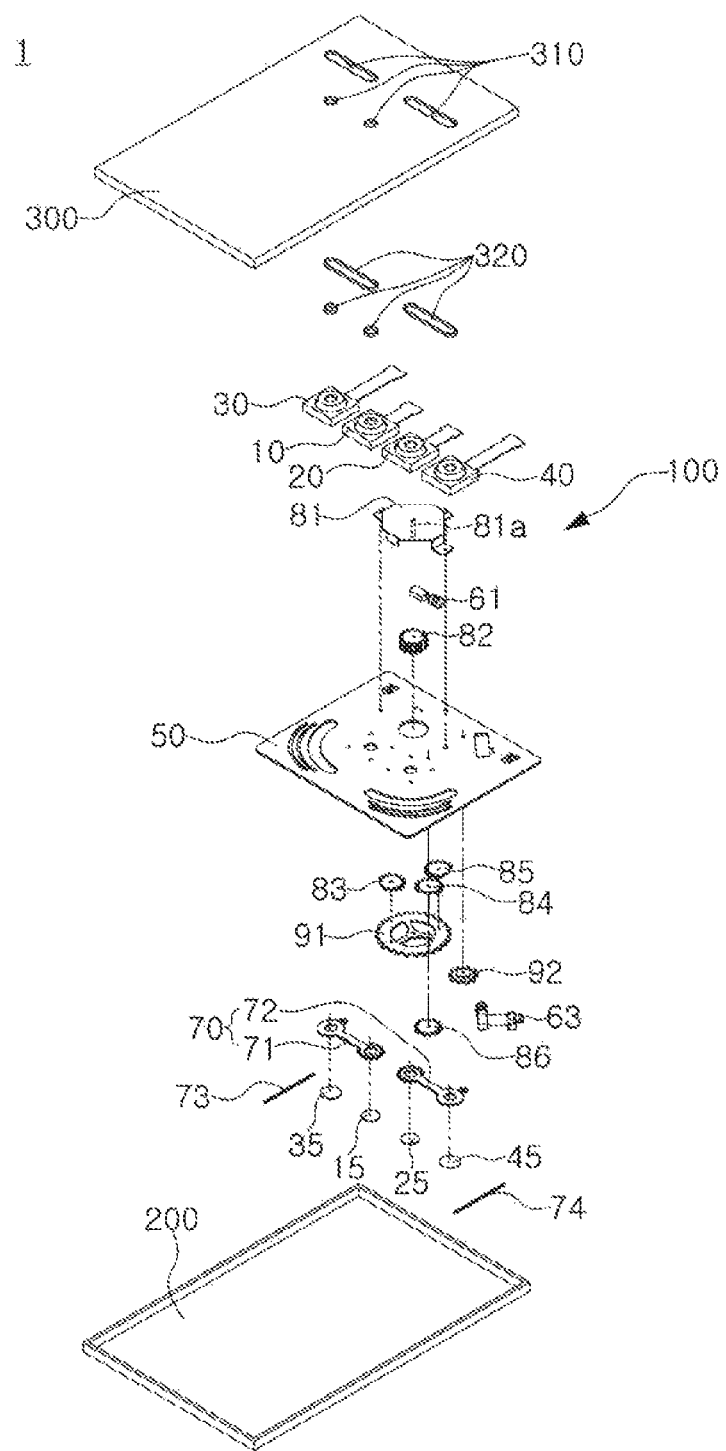
FIG. 1 is an exploded perspective view illustrating a portable electronic device according to one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

Hereinafter, embodiments of the present disclosure will be described as follows with reference to the attached drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining an understanding of the disclosure of this application. For example, the sequences of operations described herein are merely examples, and are not limited to those set forth herein, but may be changed as will be apparent after gaining an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

Due to manufacturing techniques and/or tolerances, variations of the shapes illustrated in the drawings may occur. Thus, the examples described herein are not limited to the specific shapes illustrated in the drawings, but include changes in shape that occur during manufacturing The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The use of the term "may" herein with respect to an example or embodiment (for example, as to what an example or embodiment may include or implement) means that at least one example or embodiment exists where such a feature is included or implemented, while all examples are not limited thereto.

FIG. 1 is an exploded perspective view illustrating a portable electronic device according to one or more embodiments.

Figure 2:
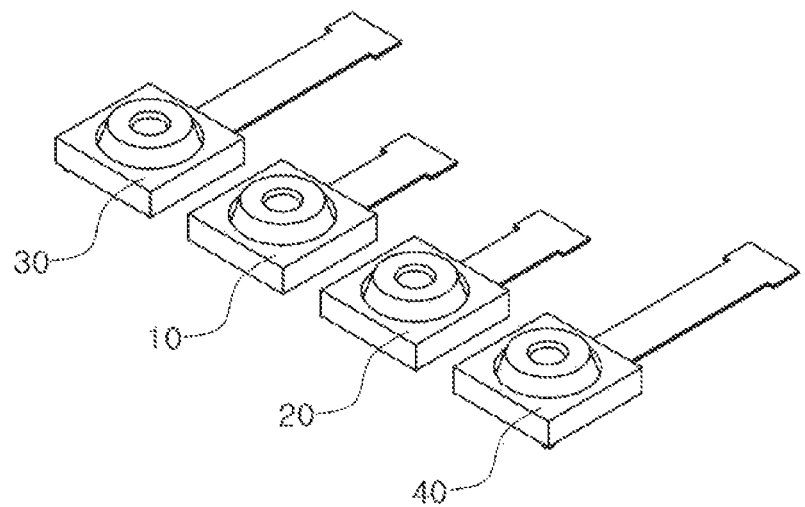
FIG. 2 is a perspective view illustrating a first camera, a second camera, a third camera, and a fourth camera according to one or more embodiments.
Figure 3:
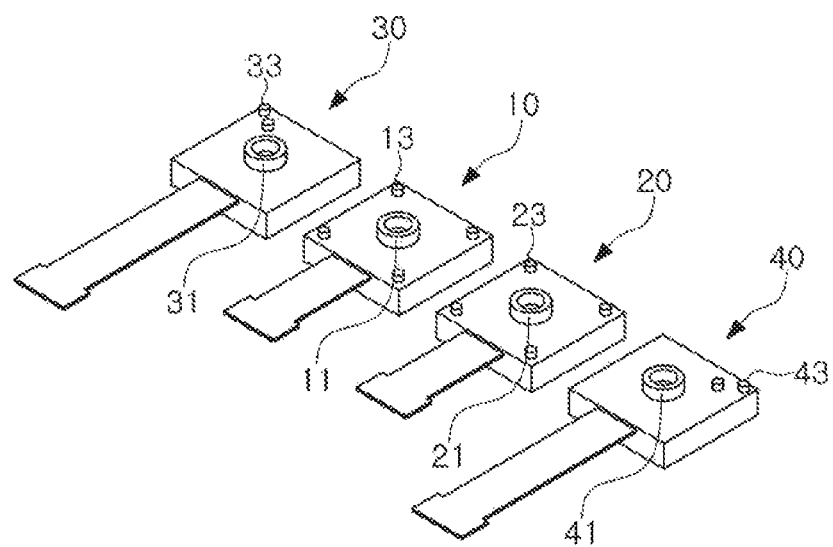
FIG. 3 is a bottom perspective view illustrating a first camera, a second camera, a third camera, and a fourth camera according to one or more embodiments.

FIG. 2 is a perspective view illustrating a first camera, a second camera, a third camera, and a fourth camera according to one or more embodiments. FIG. 3 is a bottom perspective view illustrating a first camera, a second camera, a third camera, and a fourth camera according to one or more embodiments.

Figure 4:
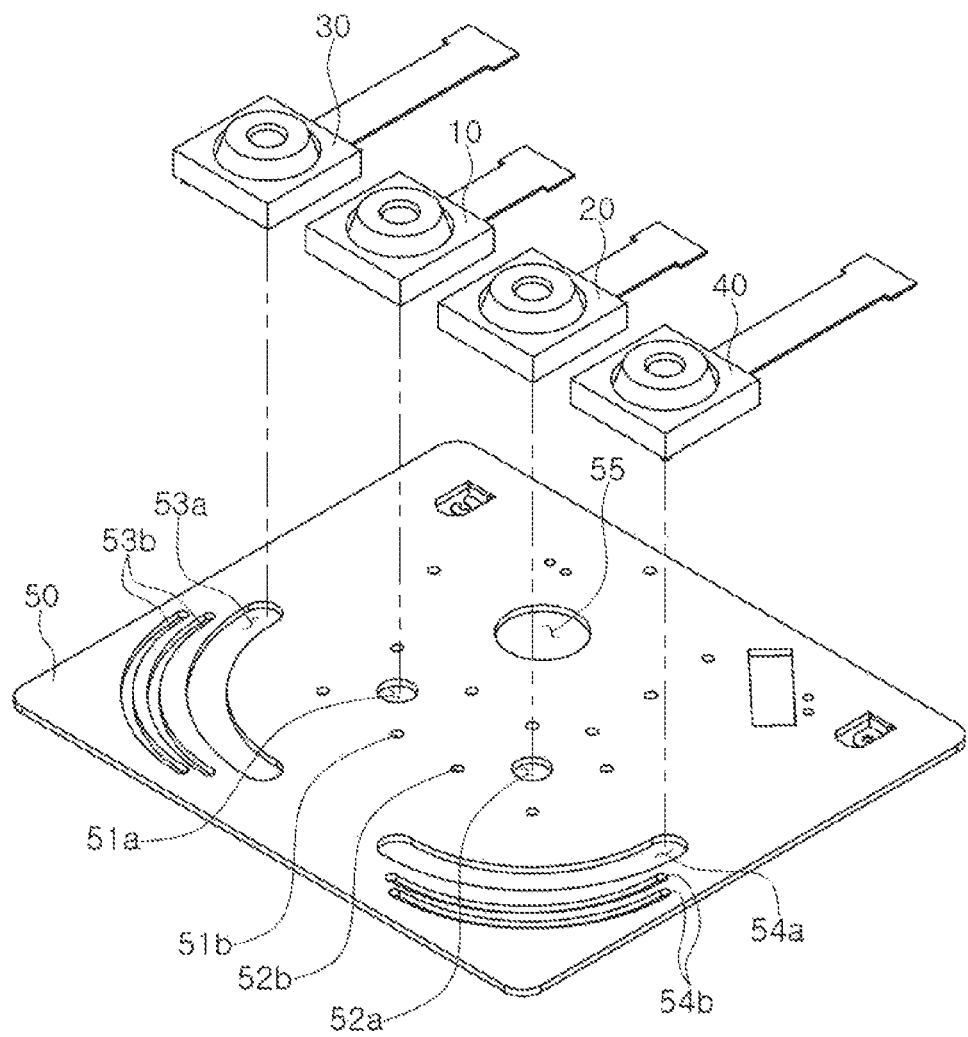
FIG. 4 is an exploded perspective view illustrating a first camera, a second camera, a third camera, a fourth camera, and a base plate according to one or more embodiments.

FIG. 4 is an exploded perspective view illustrating a first camera, a second camera, a third camera, a fourth camera, and a base plate according to one or more embodiments.

Referring to FIGS. 1 to 4, a portable electronic device 1 in an example may be, be implemented by, and/or be included in any one of a mobile communications terminal device, a smartphone, a tablet PC, and the like.

Referring to FIGS. 1 to 4, the portable electronic device 1 in an example may include a case 200, a cover 300, and a camera module 100.

The case 200 and the cover 300 may form an exterior of the portable electronic device 1, and the camera module 100 may be disposed in an internal space of the portable electronic device 1 formed by the case 200 and the cover 300.

The camera module 100 may include a plurality of cameras. As an example, the camera module 100 may include a first camera 10, a second camera 20, a third camera 30, and a fourth camera 40, each configured to image an object.

Positions of a portion of the plurality of cameras may be configured to be changed. As an example, positions of the first camera 10 and the second camera 20 may be configured to be fixed, and positions of the third camera 30 and the fourth camera 40 may be movable.

In an example, the camera module 100 may include four cameras, but the examples thereof are not limited thereto, and the camera module 100 may include less than four cameras or more than four cameras in other examples. The camera module 100 may include at least one fixed camera and at least two movable cameras.

The camera module 100 may include the first camera 10, the second camera 20, the third camera 30, the fourth camera 40, and a base plate 50.

The first camera 10, the second camera 20, the third camera 30, and the fourth camera 40 may be mounted on one surface of the base plate 50.

The first camera 10 and the second camera 20 may be spaced apart from each other by a predetermined gap, the third camera 30 may be spaced apart from the first camera 10 by a predetermined gap, and the fourth camera 40 may be spaced apart from the second camera 20 by a predetermined gap.

As an example, the first to fourth cameras 10 to 40 may be spaced apart from one another such that centers of the cameras may be disposed linearly.

The first camera 10 and the second camera 20 may be configured to be fixed with respect to the base plate 50, and the third camera 30 and the fourth camera 40 may be configured to be movable with respect to the base plate 50. Further, the third camera 30 and the fourth camera 40 may be configured to be able to move selectively or collectively.

As an example, the third camera 30 may be configured to be rotatable with reference to the first camera 10, and the fourth camera 40 may be configured to be rotatable with reference to the second camera 20.

One of the third camera 30 and the fourth camera 40 may selectively rotate, and/or the third camera 30 and the fourth camera 40 may rotate together.

A rotation direction of the third camera 30 and a rotation direction of the fourth camera 40 may be opposite to each other. As an example, the third camera 30 may rotate in a counter-clockwise direction (around the first camera 10, for example), and the fourth camera 40 may rotate in a clockwise direction (around the second camera 20, for example). Accordingly, when the third camera 30 and the fourth camera 40 rotate together, the third camera 30 and the fourth camera 40 may move to be close to each other or to be spaced apart from each other.

Figure 23A:
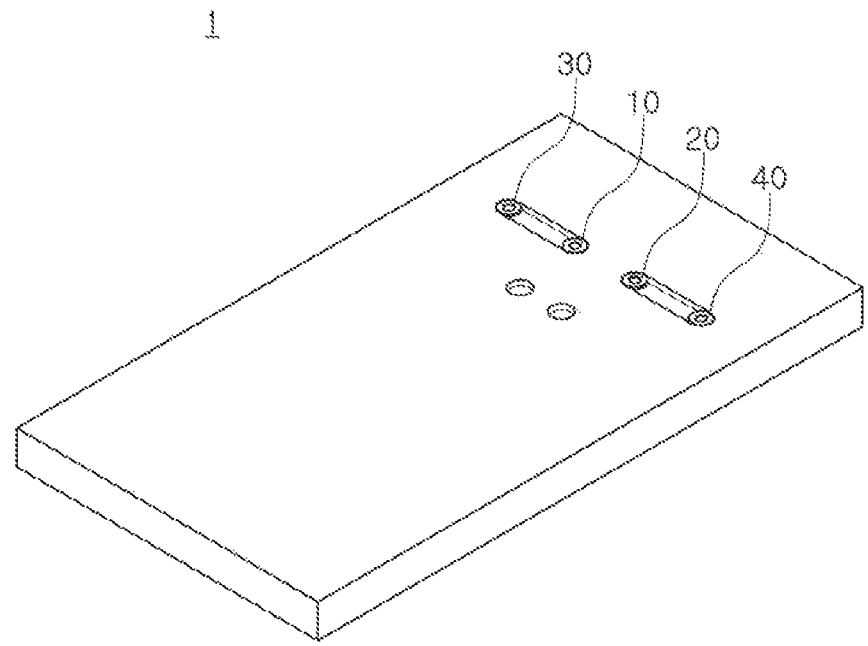
FIG. 23A is a perspective view illustrating a portable electronic device, illustrating a state in which first to fourth cameras of a camera module are disposed in an initial position according to one or more embodiments.
Figure 23B:
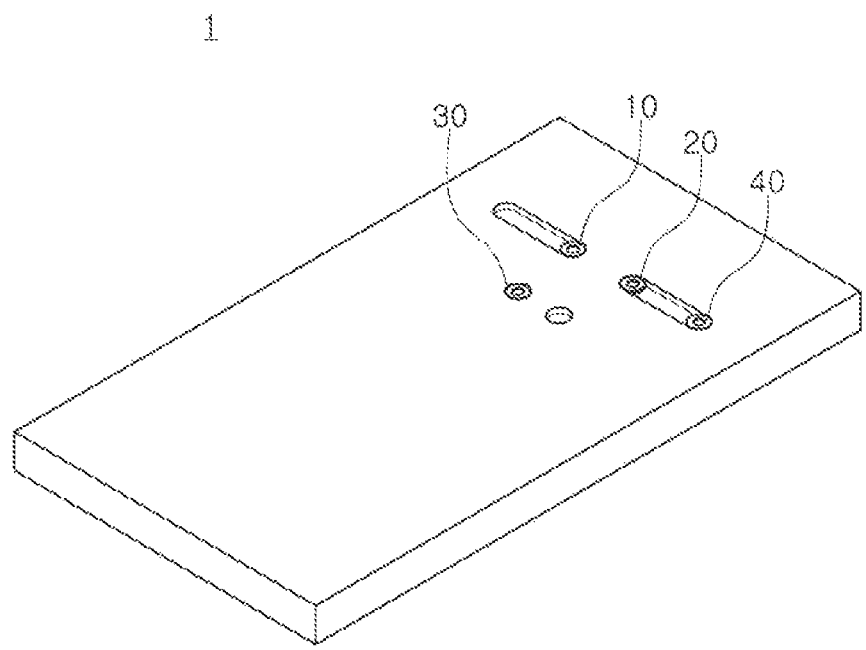
FIG. 23B is a perspective view illustrating a portable electronic device, illustrating a state in which a third camera is disposed in a rotation position according to one or more embodiments.
Figure 23C:
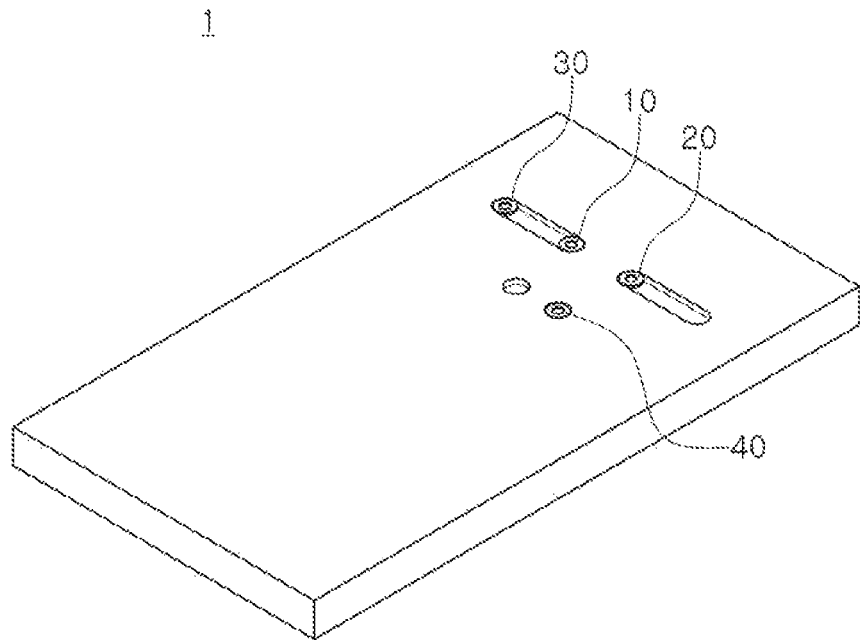
FIG. 23C is a perspective view illustrating a portable electronic device, illustrating a state in which a fourth camera is disposed in a rotation position according to one or more embodiments.

When one of the third camera 30 and the fourth camera 40 moves selectively, the first to fourth cameras 10 to 40 may be disposed in triangular form. For example, when the moving of the cameras is completed, a line connecting centers of adjacent cameras may form a right-angle triangle (as shown in FIGS. 23B and 23C, as non-limiting examples).

Figure 23D:
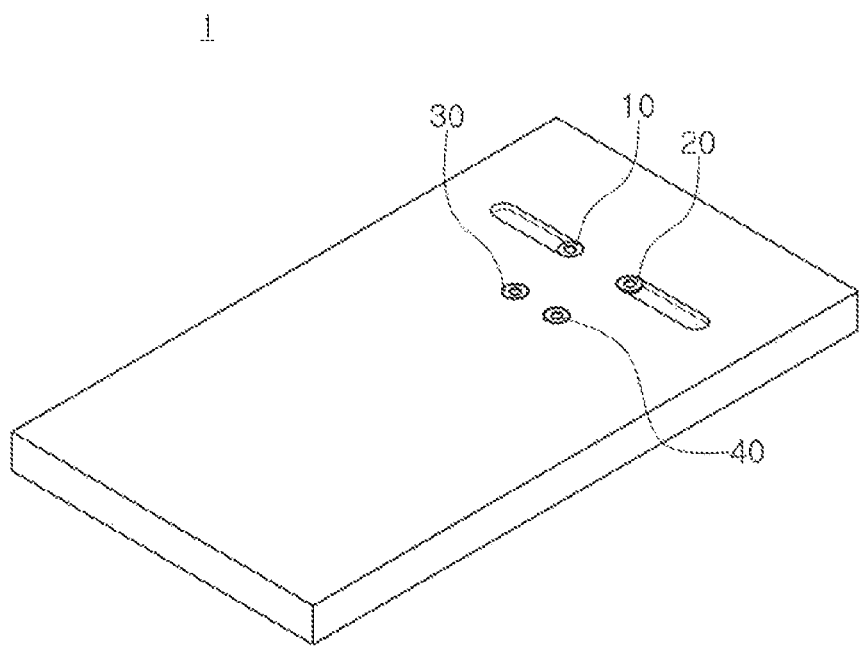
FIG. 23D is a perspective view illustrating a portable electronic device, illustrating a state in which a third camera and a fourth camera are disposed in a rotation position according to one or more embodiments.

When the third camera 30 and the fourth camera 40 move together, the first to fourth cameras 10 to 40 may be disposed in rectangular form. For example, when the moving of the cameras is completed, a line connecting centers of adjacent cameras may form a rectangle (as shown in FIG. 23D, as a non-limiting example).

The base plate 50 may include a plurality of holes penetrating the base plate 50 (as shown in FIG. 4, as a non-limiting example). As an example, the base plate 50 may include a first insertion hole 51*a*, a second insertion hole 52*a*, a first guide hole 53*a*, and a second guide hole 54*a*.

Each of the first to fourth cameras 10 to 40 may include a protrusion (as shown in FIG. 3, as a non-limiting example). As an example, the first camera 10 may include a first protrusion 11 protruding from a bottom surface of the first camera 10, the second camera 20 may include a second protrusion 21 protruding from a bottom surface of the second camera 20, the third camera 30 may include a third protrusion 31 protruding from a bottom surface of the third camera 30, and the fourth camera 40 may include a fourth protrusion 41 protruding from a bottom surface of the fourth camera 40.

Each of the first to fourth protrusions 11 to 41 may have a cylindrical shape.

The first protrusion 11 may be disposed in the first insertion hole 51*a*, the second protrusion 21 may be disposed in the second insertion hole 52a, the third protrusion 31 may be disposed in the first guide hole 53a, and the fourth protrusion 41 may be disposed in the second guide hole 54a.

A length of each of the first to fourth protrusions 11 to 41 may be greater than a thickness of the base plate 50. Accordingly, each of the protrusions 11, 21, 31, and 41 may be disposed to protrude externally of the base plate 50 (e.g., external to a surface of the base plate 50 opposite the one surface of the base plate 50 to which the first to fourth cameras 10 to 40 are mounted on).

Each of the first insertion hole 51a and the second insertion hole 52a may have a circular shape, the first protrusion 11 may be inserted into the first insertion hole 51a, and the second protrusion 21 may be inserted into the second insertion hole 52a.

A plurality of first fastening holes 51b may be provided around the first insertion hole 51a, and a plurality of second fastening holes 52b may be provided around the second insertion hole 52a. As an example, the plurality of first fastening holes 51b may be formed in a position corresponding to an edge region of the first camera 10, and the plurality of second fastening holes 52b may be formed in a position corresponding to an edge region of the second camera 20.

The first camera 10 may include a plurality of fastening projections 13 around the first protrusion 11, and the second camera 20 may include a plurality of fastening projections 23 around the second protrusion 21.

As an example, the first protrusion 11 may be formed on a center of the bottom surface of the first camera 10, and the plurality of fastening projections 13 may be formed on an edge region of the bottom surface of the first camera 10. The second protrusion 21 may be formed on a center of the bottom surface of the second camera 20, and the plurality of fastening projections 23 may be formed on an edge region of the bottom surface of the second camera 20.

The plurality of fastening projections 13 may be inserted into the plurality of first fastening holes 51b, and accordingly, a position of the first camera 10 may be fixed with respect to the base plate 50. Also, the plurality of fastening projections 23 may be inserted into the plurality of fastening holes 52b, and accordingly, a position of the second camera 20 may be fixed with respect to the base plate 50.

Each of the first guide hole 53a and the second guide hole 54a may have a shape having a length in a rotation direction of a corresponding camera.

The third protrusion 31 may be movable along the first guide hole 53a, and the fourth protrusion 41 may be movable along the second guide hole 54a.

Each of the first guide hole 53a and the second guide hole 54a may have an arc shape for rotation of the third camera 30 and the fourth camera 40.

As an example, each of the first guide hole 53a and the second guide hole 54a may have a rounded shape.

The base plate 50 may further include a plurality of guide rails (as shown in FIG. 4, as a non-limiting example). As an example, the base plate 50 may include a first guide rail 53b and a second guide rail 54b.

The first guide rail 53b may be disposed adjacent to the first guide hole 53a, and the second guide rail 54b may be disposed adjacent to the second guide hole 54a.

The first guide rail 53b may have a shape having a length in a rotation direction of the third camera 30, and the second guide rail 54b may have a shape having a length in a rotation direction of the fourth camera 40.

Each of the first guide rail 53b and the second guide rail 54b may have an arc shape. As an example, each of the first guide rail 53b and the second guide rail 54b may have a rounded shape.

The first guide rail 53b may include two guide rails, and the two guide rails may be spaced apart from each other by a predetermined gap.

The second guide rail 54b may include two guide rails, and the two guide rails may be spaced apart from each other by a predetermined gap.

Each of the third camera 30 and the fourth camera 40 may include a guide projection (as shown in FIG. 3, as a non-limiting example). The third camera 30 may include a first guide projection 33 around the third protrusion 31, and the fourth camera 40 may include a second guide projection 43 around the fourth protrusion 41.

As an example, the third protrusion 31 may be formed on a center of the bottom surface of the third camera 30, and the first guide projection 33 may be disposed in a position spaced apart from the third protrusion 31 in a diagonal direction. The fourth protrusion 41 may be formed on a center of the bottom surface of the fourth camera 40, and the second guide projection 43 may be disposed in a position spaced apart from the fourth protrusion 41 in a diagonal direction.

The first guide projection 33 may include two guide protrusions, and the two guide protrusions may be spaced apart from each other by a predetermined gap.

The second guide projection 43 may include two guide protrusions, and the two guide protrusions may be spaced apart from each other by a predetermined gap.

The first guide projection 33 may be inserted into the first guide rail 53b, and the second guide projection 43 may be inserted into the second guide rail 54b.

The first guide projection 33 may be movable along the first guide rail 53b, and the second guide projection 43 may be movable along the second guide rail 54b.

The third camera 30 may rotate in a clockwise or counter-clockwise direction (with reference to FIG. 4) along the first guide hole 53a and the first guide rail 53b with reference to the first camera 10.

The fourth camera 40 may rotate in a clockwise or counter-clockwise direction (with reference to FIG. 4) along the second guide hole 54a and the second guide rail 54b with reference to the second camera 20.

The third camera 30 and the fourth camera 40 may rotate and move individually, or may rotate and move collectively.

As an example, one of the third camera 30 and the fourth camera 40 may rotate and move selectively, and the third camera 30 and the fourth camera 40 may rotate and move collectively to be adjacent to each other or to be spaced apart from each other.

Referring to FIG. 1, a cover 300 of a portable electronic device 1 may include an opening 310 through which light is incident. A cover glass 320 may be disposed in the opening 310.

The cover glass 320 may shield the opening 310. Accordingly, the cover glass 320 may prevent external foreign objects, and the like, from entering an internal space of the portable electronic device 1.

FIGS. 5A to 5H are bottom views or plan views illustrating a process in which first to fourth cameras are coupled to a base plate according to one or more embodiments.

Figure 5A:
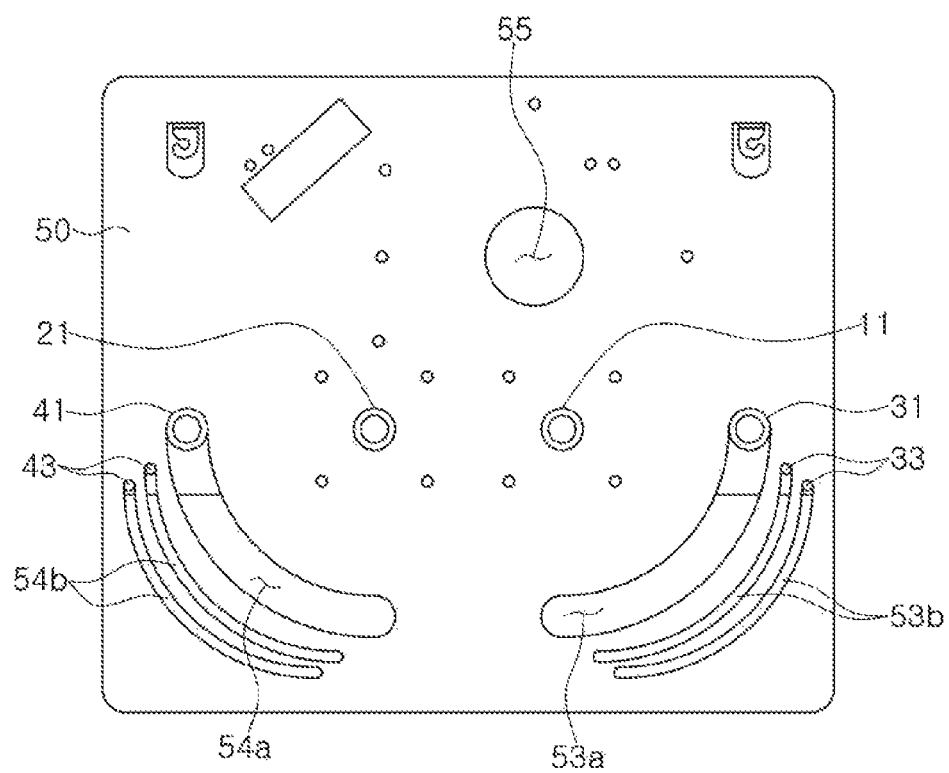
FIGS. 5A to 5H are bottom views or plan views illustrating a process in which first to fourth cameras are coupled to a base plate according to one or more embodiments.

FIG. 5A is a bottom view illustrating a state in which first to fourth cameras 10 to 40 are coupled to a base plate 50. Referring to FIG. 5A, the first to fourth cameras 10 to 40 may be coupled to the one surface of the base plate 50. Each of the protrusions 11, 21, 31, and 41 of the cameras may be disposed to protrude from another surface of the base plate 50 to an external side.

The one surface of the base plate 50 (discussed above with reference to FIG. 4, for example) may be an opposite surface of a surface of the base plate 50 illustrated in FIG. 5A, and another surface of the base plate 50 may be the surface of the base plate 50 illustrated in FIG. 5A.

The first camera 10 and the second camera 20 may be fixed to and disposed in the base plate 50 by coupling between a fixed projection with a fixed hole.

Figure 5B:
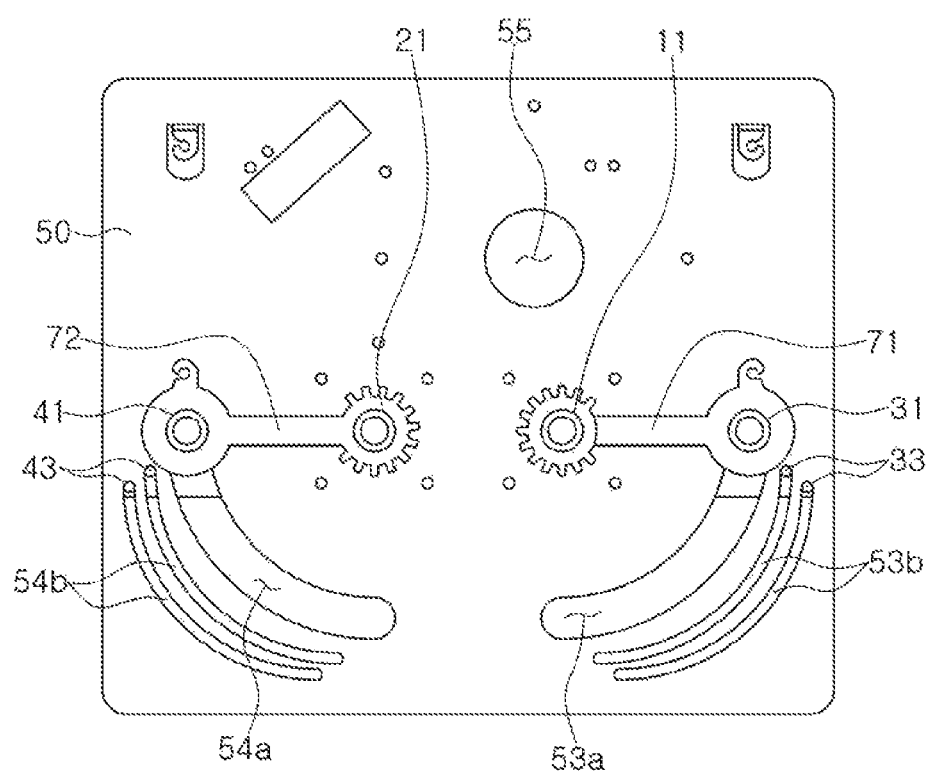

FIG. 5B is a bottom view illustrating an example in which the first camera 10 and the third camera 30 are connected to each other by a link member, and the second camera 20 and the fourth camera 40 are connected to each other by a link member. Referring to FIG. 5B, a portion of the plurality of cameras included in a camera module may be connected to each other by a link member (e.g., either one or both of a first link member 71 and a second link member 72).

The first to fourth cameras 10 to 40 may be mounted on the one surface of the base plate 50, and the link member may be mounted on the other surface of the base plate 50. The base plate 50 may include the first link member 71 and the second link member 72.

As an example, the first camera 10 and the third camera 30 may be connected to each other by the first link member 71, and the second camera 20 and the fourth camera 40 may be connected to each other by the second link member 72.

An insertion hole may be provided on each side of the first link member 71. The insertion hole on one side of the first link member 71 may be coupled to the first protrusion 11 of the first camera 10 and the insertion hole on the other side of the first link member 71 may be coupled to the third protrusion 31 of the third camera 30. Accordingly, the one side of the first link member 71 may be coupled to the first protrusion 11, and the other side (an opposite side of the one side) of the first link member 71 may be coupled to the third camera 30.

Each of the insertion holes of the first protrusion 11 of the first camera 10, the third protrusion 31 of the third camera 30, and the first link member 71 may have a circular shape. Accordingly, the one side of the first link member 71 may be rotatable with respect to the first camera 10, and the other side of the first link member 71 may be rotatable with respect to the third camera 30.

An external side surface of the one side of the first link member 71 may have a gear shape.

An insertion hole may be provided on each side of the second link member 72. The insertion hole on one side of the second link member 72 may be coupled to the second protrusion 21 of the second camera 20 and the insertion hole on the other side of the second link member 72 may be coupled to the fourth protrusion 41 of the fourth camera 40. Accordingly, one side of the second link member 72 may be coupled to the second protrusion 21, and the other side (an opposite side of the one side) of the second link member 72 may be coupled to the fourth protrusion 41.

Each of the insertion holes of the second protrusion 21 of the second camera 20, the fourth protrusion 41 of the fourth camera 40, and the second link member 72 may have a circular shape. Accordingly, the one side of the second link member 72 may be rotatable with respect to the second camera 20, and the other side of the second link member 72 may be rotatable with respect to the fourth camera 40.

An external side surface of the one side of the second link member 72 may have a gear shape.

Figure 5C:
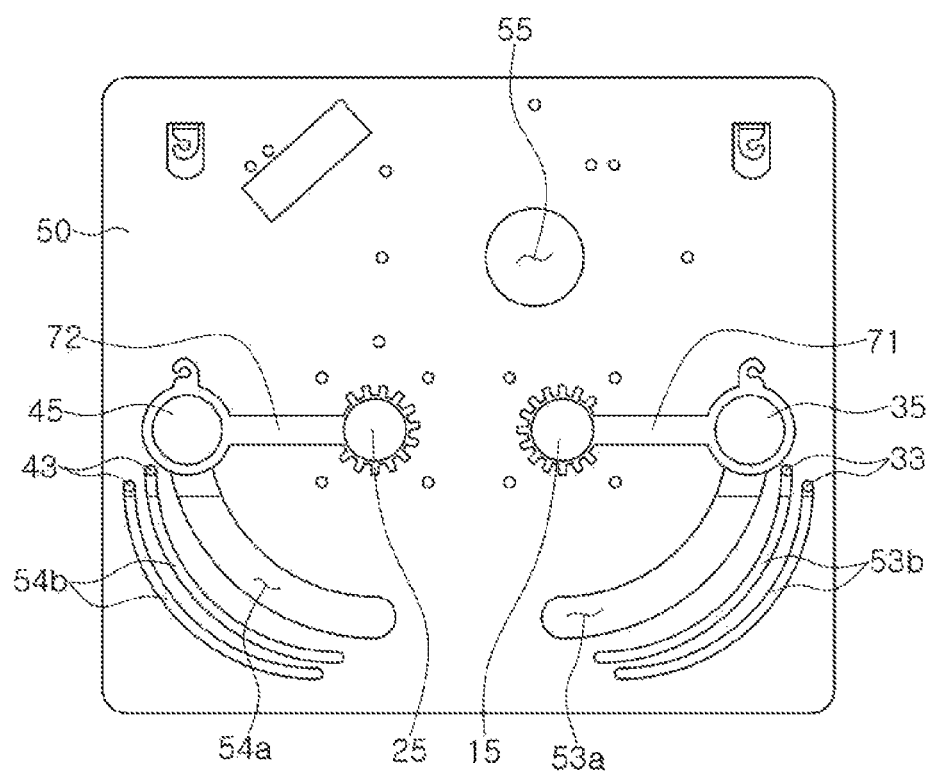

Referring to FIG. 5C, caps 15, 25, 35, and 45 may be coupled to ends of the protrusions 11, 21, 31, and 41, respectively, to prevent the first link member 71 and the second link member 72 from being detached.

Figure 5D:
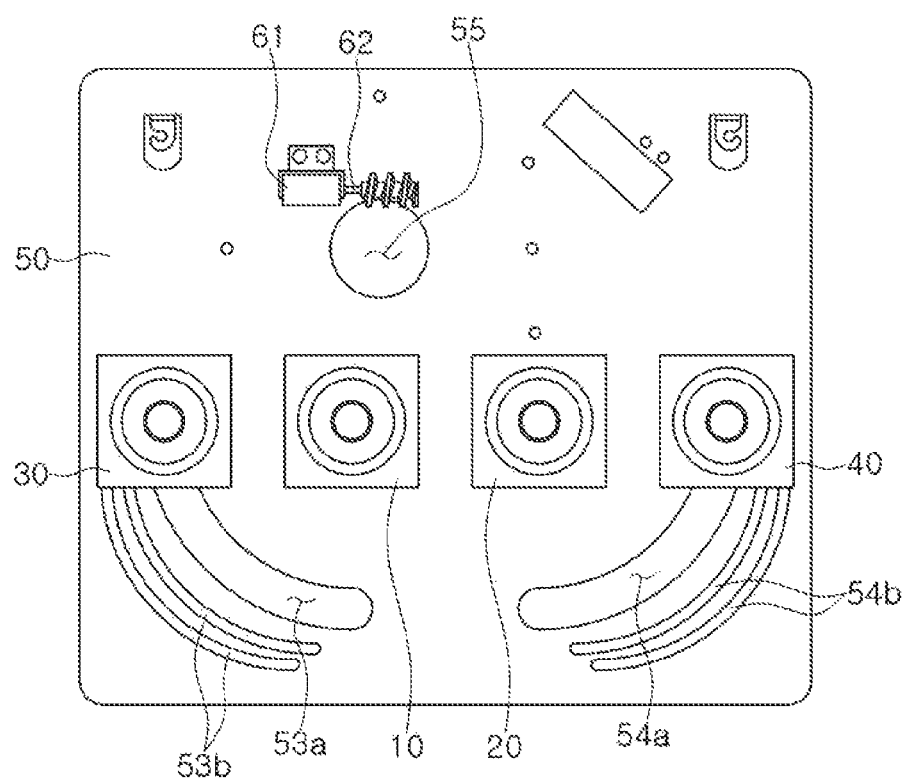

FIG. 5D is a plan view illustrating a state in which the first to fourth cameras 10 to 40 are coupled to the base plate 50.

Referring to FIG. 5D, a first driver 61 may be disposed on the one surface of the base plate 50. The first driver 61 may be configured as a motor having a rotating shaft 62, and the rotating shaft 62 of the first driver 61 may include a thread shape.

A receiving hole 55 penetrating the base plate 50 may be provided in the base plate 50.

The receiving hole 55 may be disposed adjacent to the rotating shaft 62 of the first driver 61.

Figure 5E:
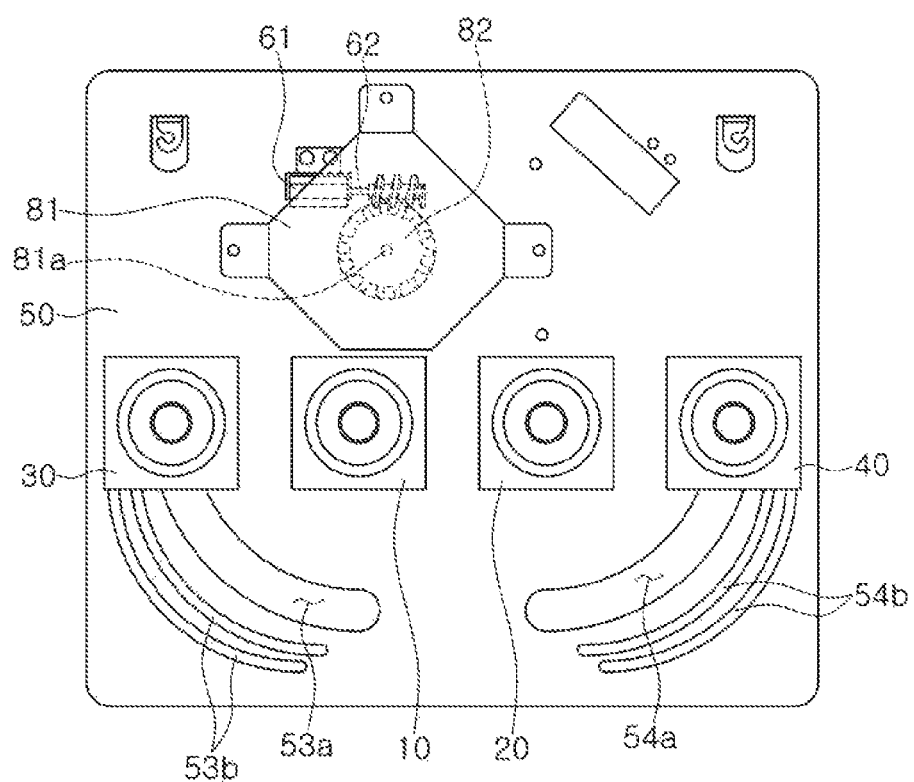

Referring to FIG. 5E, a support plate 81 covering the receiving hole 55 may be coupled to the one surface of the base plate 50. A coupling portion bent on the support plate 81 may be provided on the support plate 81, and the coupling portion may be coupled to the base plate 50. Accordingly, the support plate 81 may be spaced apart from the base plate 50 by a predetermined distance.

The support plate 81 may include a shaft 81a penetrating the receiving hole 55, and a driving gear 82 may be coupled to the shaft 81a. The driving gear 82 may be disposed in the receiving hole 55 and may be rotatably coupled to the shaft 81a.

The driving gear 82 may be disposed in the receiving hole 55 to protrude to both sides of the receiving hole 55. The driving gear 82 protruding to one side (e.g., from the one surface of the base plate 50) of the receiving hole 55 may be engaged with the rotation shaft 62 of the first driver 61, and the driving gear 82 protruding to the other side (e.g., from the other surface of the base plate 50) of the receiving hole 55 may be engaged with first to third sub gears 83, 84, and 85 (as shown in FIG. 1).

The driving gear 82 may be arranged to be engaged with the rotating shaft 62 of the first driving unit 61. Accordingly, a worm gear may be configured by the first driver 61 and the driving gear 82.

The driving gear 82 may rotate in a clockwise or counterclockwise direction by driving force of the first driver 61.

Figure 5F:
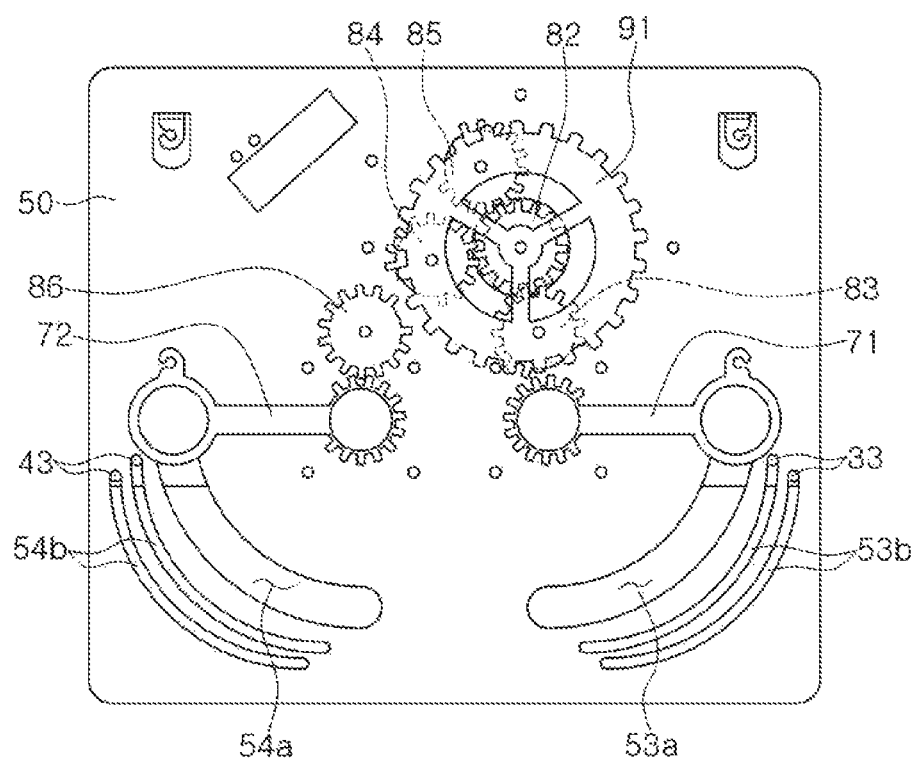

FIG. 5F is a bottom view illustrating a state in which a plurality of gears are provided on a base plate.

Referring to FIG. 5F, a first moving gear 91 may be provided on the other surface of the base plate 50. The first moving gear 91 may be coupled to the shaft 81a of the support plate 81. The first moving gear 91 may be rotatable with respect to the shaft 81a.

The rotating shaft 62 of the first driver 61 may be engaged with the driving gear 82, and may not be engaged with the first moving gear 91. Accordingly, when the driving gear 82 rotates by driving force of the first driver 61, the first moving gear 91 may not rotate. The first moving gear 91 may rotate by a second driver 63.

The first moving gear 91 may be spaced apart from the other surface of the base plate 50. Accordingly, a space may be formed between the first moving gear 91 and the other surface of the base plate 50.

A first sub-gear 83, a second sub-gear 84, and a third sub-gear 85 may be disposed in the above-described space.

Each of the first to third sub-gears 83, 84, and 85 may be coupled to the first moving gear 91, and may be rotatably provided with respect to the first moving gear 91.

The first to third sub-gears 83, 84, and 85 may be spaced apart from one another in a circumferential direction of the first moving gear 91.

A spur gear 86 may be rotatably provided on the other surface of the base plate 50, and may be disposed to be engaged with the one side of the second link member 72.

A portion of a circumferential surface of each of the first to third sub gears 83, 84, and 85 and the spur gear 86 may have a region in which a gear is not formed.

For example, the first to third sub-gears 83, 84, and 85 and the spur gear 86 may include sawtooth portions 83a, 84a, 85a, and 86a and arc portions 83b, 84b, 85b, and 86b, respectively (as further described below with reference to FIGS. 7A and 7B, as non-limiting examples). The sawtooth portions 83a, 84a, 85a, and 86a may respectively refer to a portion of a circumferential surface of each of the first to third sub-gears 83, 84, and 85 and the spur gear 86 in which a gear is provided, and the arc portions 83b, 84b, 85b, and 86b may refer to a portion of a circumferential surface of each of the first to third sub-gears 83, 84, and 85 and the spur gear 86 in which a gear is not provided.

Each of the sawtooth portions 83a, 84a, and 85a respectively of the first to third sub gears 83, 84, and 85 may be disposed to be engaged with the driving gear 82.

Accordingly, driving force of the first driver 61 may be transferred to the first to third sub-gears 83, 84, and 85 through the driving gear 82.

Positions of the first to third sub-gears 83, 84, and 85 may change according to a camera to be rotated.

In other words, positions of the first to third sub-gears 83, 84, and 85 may change to selectively transfer power to at least one of the third camera 30 and the fourth camera 40.

Accordingly, at least one of the first to third sub-gears 83, 84, and 85 may be engaged with at least one of the first link member 71 and the spur gear 86.

The third camera 30 may rotate alone (when the fourth camera 40 does not rotate, for example) by the first sub-gear 83. The fourth camera 40 may rotate alone by the second sub-gear 84.

Also, the third camera 30 and the fourth camera 40 may rotate together by the second sub-gear 84 and the third sub-gear 85, where the third camera 30 rotates by the second sub-gear 84 and the fourth camera 40 rotates by the third sub-gear 85.

In other words, positions of the first to third sub-gears 83, 84, and 85 may change according to an object to be rotated.

The first to third sub-gears 83, 84, and 85 may be movable to a first position, a second position, and a third position.

When the first to third sub-gears 83, 84, and 85 are disposed in the first position or the second position, one of the third camera 30 and the fourth camera 40 may be movable, and when the first to third sub-gears 83, 84, and 85 are disposed in the third position, the third camera 30 and the fourth camera 40 may be movable together.

For example, when the third camera 30 rotates alone, the first to third sub-gears 83, 84, and 85 may be disposed in the first position. The first position may refer to a position in which the first sub-gear 83 may be disposed adjacent to the one side of the first link member 71, and the second and third sub-gears 84 and 85 may be spaced apart from the first link member 71 and the spur gear 86 by a predetermined distance (as shown in FIG. 7A, as a non-limiting example).

Figure 13A:
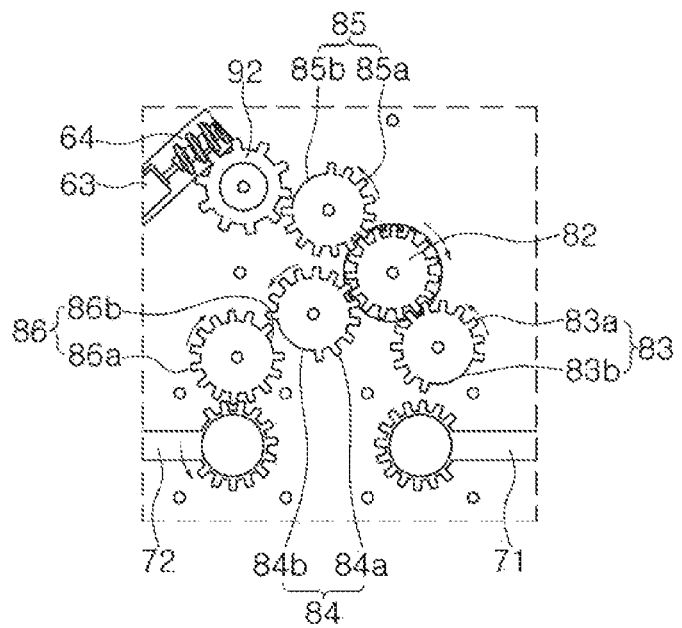
FIG. 13A is a view illustrating states of first to third sub gears according to one or more embodiments.

When the fourth camera 40 rotates alone, the first to third sub-gears 83, 84, and 85 may be disposed in a second position. The second position may refer to a position in which the second sub-gear 84 may be disposed adjacent to the spur gear 86 and the first and third sub-gears 83 and 85 may be spaced apart from the first link member 71 and the spur gear 86 by a predetermined distance (as shown in FIG. 13A, as a non-limiting example).

Figure 19A:
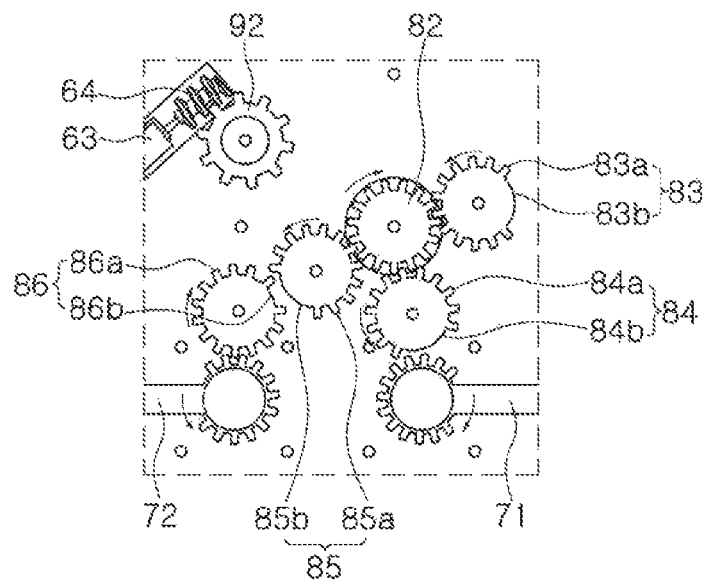
FIG. 19A is a view illustrating states of first to third sub gears according to one or more embodiments.

When the third camera 30 and the fourth camera 40 rotate together, the first to third sub-gears 83, 84, and 85 may be disposed in a third position. The third position may refer to a position in which the second sub-gear 84 may be disposed adjacent to the one side of the first link member 71, the third sub-gear 85 may be disposed adjacent to the spur gear 86, and the first sub-gear 83 may be spaced apart from the first link member 71 and the spur gear 86 by a predetermined distance (as shown in FIG. 19A, as a non-limiting example).

FIG. 5F illustrates an example in which the first to third sub-gears 83, 84, and 85 are disposed in the first position.

The first sub-gear 83 may be disposed adjacent to the one side of the first link member 71. For example, the first sub-gear 83 may be disposed such that a portion in which the sawtooth portion 83a starts may be engaged with one side of the first link member 71.

The second sub-gear 84 may be spaced apart from the first sub-gear 83, and the third sub-gear 85 may be spaced apart from the second sub-gear 84. The first to third sub-gears 83, 84, and 85 may not be engaged with one another.

Figure 5G:
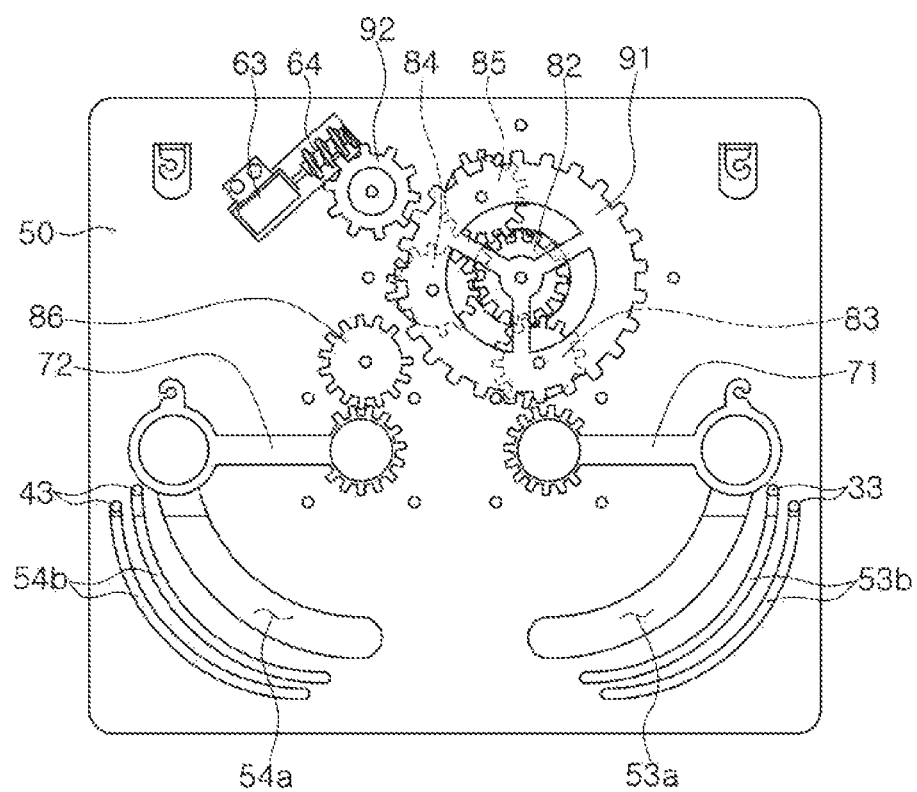

FIG. 5G is a bottom view illustrating a state in which a second driver and a second moving gear are provided on a base plate.

Referring to FIG. 5G, a second driver 63 may be disposed on the other surface of the base plate 50. The second driver 63 may be configured as a motor having a rotating shaft 64, and the rotating shaft 64 of the second driver 63 may include a thread shape.

Also, a second moving gear 92 may be disposed on the other surface of the base plate 50 to be engaged with the rotating shaft 64 of the second driver 63. Accordingly, a worm gear may be configured by the second driver 63 and the second moving gear 92.

The second moving gear 92 may be disposed to be engaged with the first moving gear 91.

The driving gear 82, the first sub-gear 83, the second sub-gear 84, and the third sub-gear 85 may rotate by the first driver 61, and the first moving gear 91 and the second moving gear 92 may rotate by the second driver 63.

When driving force is generated by the first driver 61, the driving gear 82 engaged with the first driver 61 may rotate, and the first to third sub-gears 83, 84, and 85 engaged with the driving gear 82 may also rotate.

When driving force is generated by the second driver 63, the second moving gear 92 engaged with the second driver 63 may rotate, and the first moving gear 91 engaged with the second moving gear 92 may also rotate. In this case, as the first to third sub gears 83, 84, and 85 are coupled to the first moving gear 91, the first to third sub gears 83, 84, and 85 may move along with the first moving gear 91. Accordingly, positions of the first to third sub gears 83, 84, and 85 may change by the second driver 63.

The above configuration will be further described below in greater detail with reference to FIGS. 10A to 11B.

Figure 5H:
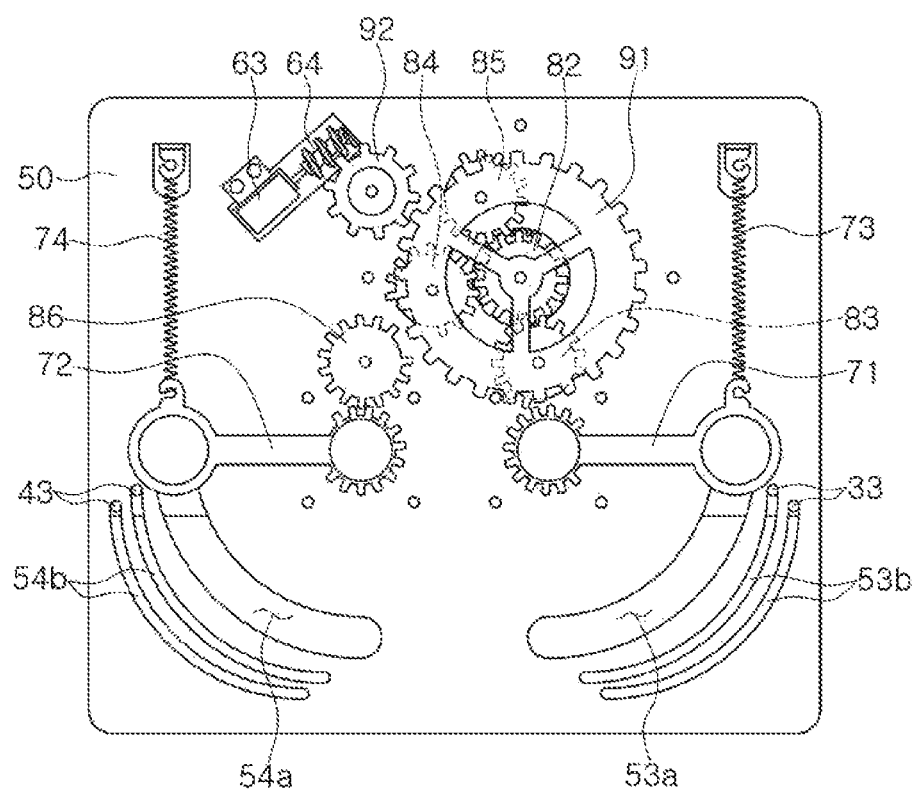

FIG. 5H is a bottom view illustrating a state in which a first elastic member and a second elastic member are provided on the base plate.

Referring to FIG. 5H, a link member (e.g., either one or both of a first link member 71 and a second link member 72) may be elastically supported by an elastic member.

As an example, one side of a first elastic member 73 may be connected to the base plate 50, and another side of the first elastic member 73 may be connected to the other side of a first link member 71. Accordingly, the first link member 71 may be elastically supported by the first elastic member 73. When rotation driving force is transferred to the first link member 71, the first link member 71 may rotate about the one side of the first link member 71 as a rotating shaft, and accordingly, the first elastic member 73 may be extended. When the driving force is removed, the first link member 71 may return to a position before the rotation by elastic force of the first elastic member 73.

One side of a second elastic member 74 may be connected to the base plate 50, and the other side of the second elastic member 74 may be connected to the other side of a second link member 72. Accordingly, the second link member 72 may be elastically supported by the second elastic member 74. When rotating driving force is transferred to the second link member 72, the second link member 72 may rotate about the one side of the second link member 72 as a rotating shaft, and accordingly, the second elastic member 74 may be extended. When the driving force is removed, the second link member 72 may return to a position before the rotation by elastic force of the second elastic member 74.

Figure 6A:
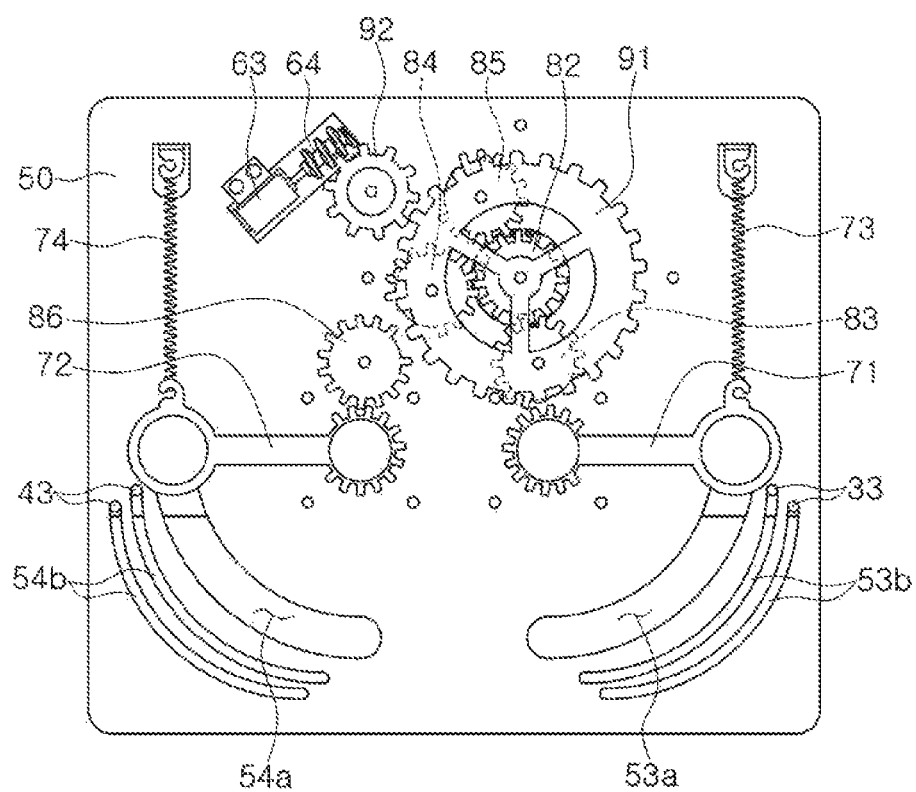
FIG. 6A is a bottom view illustrating a state in which first to fourth cameras of a camera module are disposed in an initial position according to one or more embodiments.
Figure 6B:
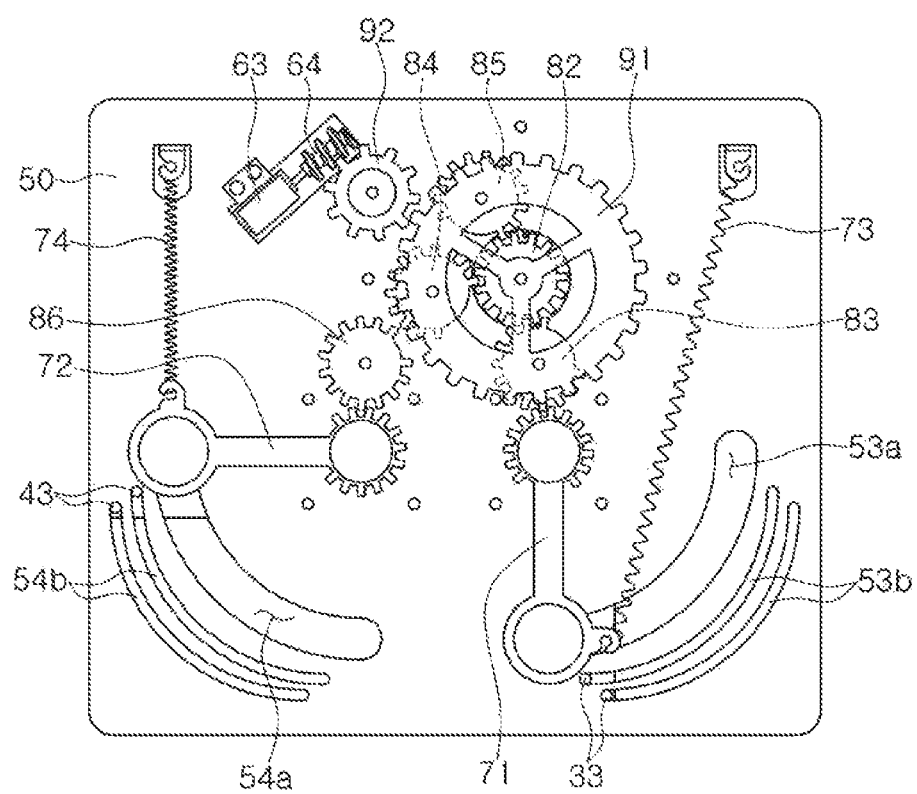
FIG. 6B is a bottom view illustrating a state in which a third camera of a camera module moves from an initial position to a moving position according to one or more embodiments.

FIG. 6A is a bottom view illustrating a state in which first to fourth cameras of a camera module are disposed in an initial position according to one or more embodiments, and FIG. 6B is a bottom view illustrating a state in which a third camera of a camera module moves from an initial position to a moving position according to one or more embodiments.

Figure 7A:
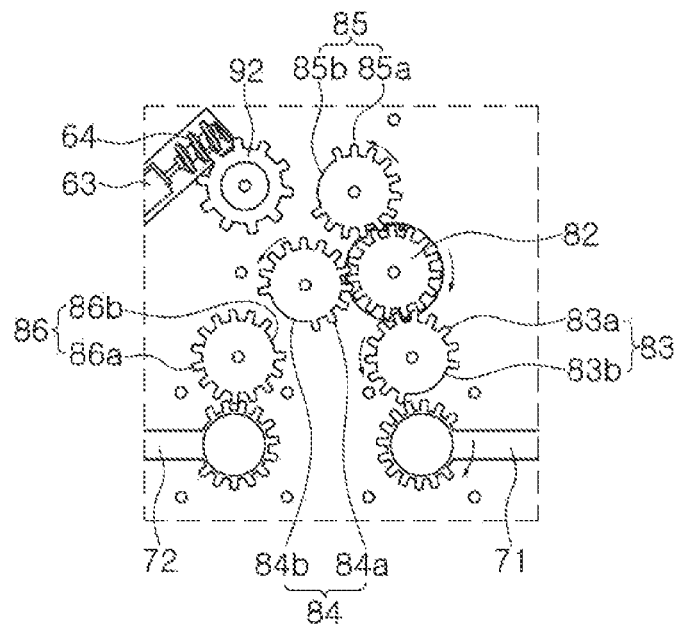
FIG. 7A is a view illustrating states of first to third sub gears according to one or more embodiments.

FIG. 7A is a view illustrating states of first to third sub gears (as shown in FIG. 6A, for example) according to one or more embodiments. FIG. 7B is a view illustrating states of first to third sub gears (as shown in FIG. 6B, for example) according to one or more embodiments.

Figure 7B:
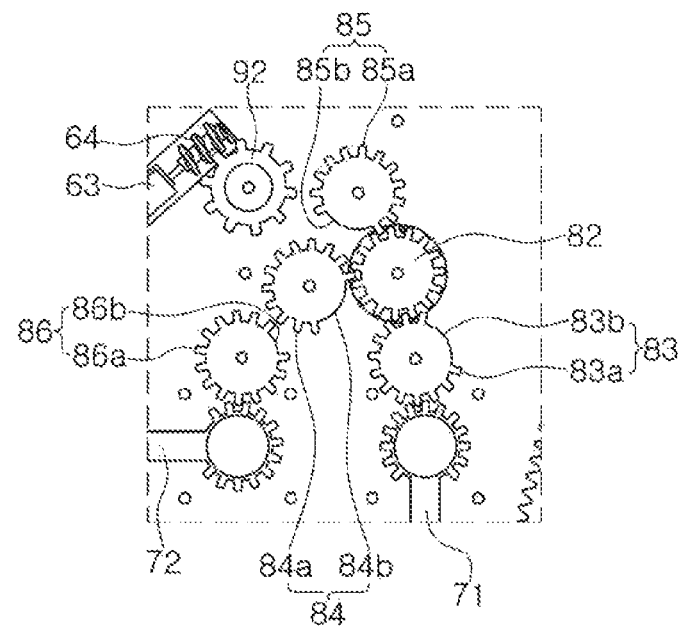
FIG. 7B is a view illustrating states of first to third sub gears according to one or more embodiments.

FIGS. 7A and 7B do not illustrate the first moving gear 91 to more easily describe an operation of the first to third sub gears 83, 84, and 85.

FIG. 6A illustrates an example in which the first to fourth cameras 10 to 40 are disposed in an initial position. The initial position refers to a position in which centers of the first to fourth cameras 10 to 40 are, or are substantially, disposed linearly.

FIG. 6B illustrates an example in which the third camera 30 is disposed in a moving position. The moving position may refer to a position rotated from the initial position by 90°. However, in other examples, the moving position may refer to a position rotated from the initial position by less than 90° or more than 90°. When the third camera 30 is disposed in the moving position, a line connecting centers of the first to fourth cameras 10 to 40 may form a triangle.

The third camera 30 may move from the initial position to the moving position by the driving gear 82, the first sub-gear 83, and the first link member 71.

When the third camera 30 rotates alone, the first to third sub-gears 83, 84, and 85 may be disposed in a first position. For example, the first sub-gear 83 may be disposed adjacent to one side of the first link member 71. Also, the second and third sub-gears 84 and 85 may be disposed in a position which may be engaged with the driving gear 82 and may not be engaged with the other elements (such as the first link member 71 and the spur gear 86, for example).

Referring to FIG. 7A, the driving gear 82 may rotate in one direction (a clockwise direction with reference to FIG. 7A) by the first driver 61. As the first to third sub-gears 83, 84, and 85 are engaged with the driving gear 82, each of the first to third sub-gears 83, 84, and 85 may rotate in the other direction (in a counter-clockwise direction with reference to FIG. 7A) when the driving gear 82 rotates in the one direction. The other direction may refer to an opposite direction of the one direction.

The first sub-gear 83 may be disposed in a position adjacent to the first link member 71. For example, the first sub-gear 83 may be disposed such that a portion in which a sawtooth portion 83a starts may be engaged with the one side of the first link member 71.

Accordingly, when the first sub-gear 83 rotates in the other direction, the first sub-gear 83 and the first link member 71 may be engaged with each other such that the first link member 71 may rotate in the one direction.

Driving force of the first driver 61 may be transferred to the first link member 71 through the driving gear 82 and the first sub-gear 83 such that the first link member 71 may rotate, and accordingly, the third camera 30 connected to the other side of the first link member 71 may move from an initial position to the moving position.

As the second and third sub-gears 84 and 85 are also engaged with the driving gear 82, the second and third sub-gears 84 and 85 may also rotate by the driving gear 82. However, when the second and third sub-gears 84 and 85 are disposed in a region which does not interfere or engage with the first link member 71 and the second link member 72, rotation of the second and third sub-gears 84 and 85 may not affect or rotate the first link member 71 and the second link member 72.

For example, when the third camera 30 rotates alone, the second and third sub-gears 84 and 85 may not be engaged with the other elements other than the driving gear 82 (such as the first link member 71 and the spur gear 86, for example).

Figure 8A:
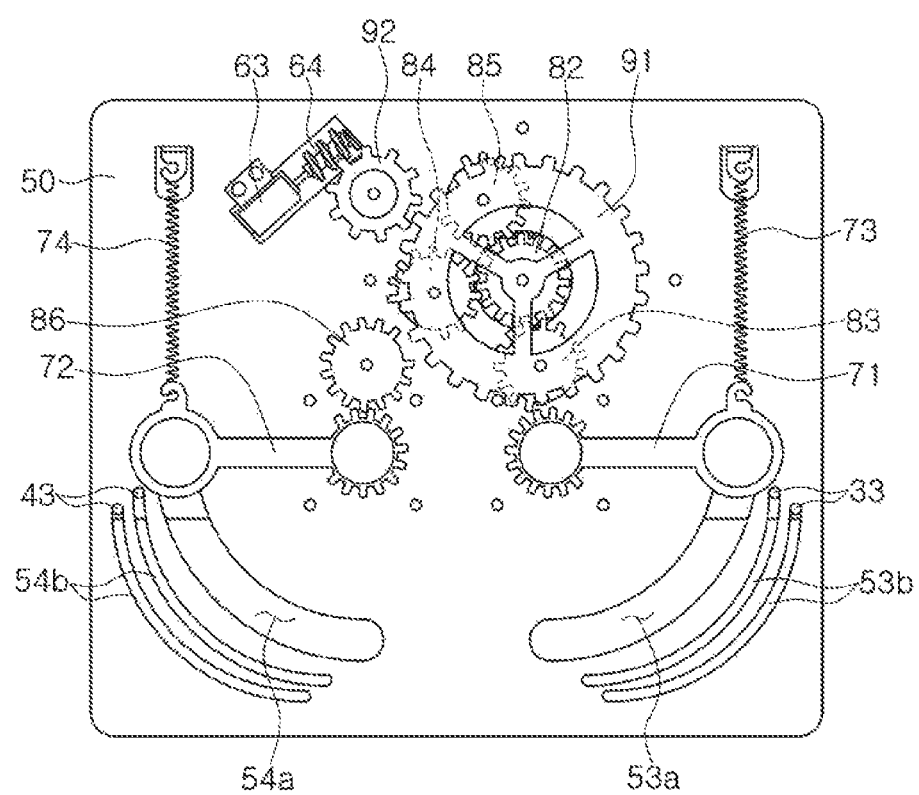
FIGS. 8A and 8B are views illustrating examples in which positions of first to third sub-gears are adjusted by a driving gear according to one or more embodiments.
Figure 8B:
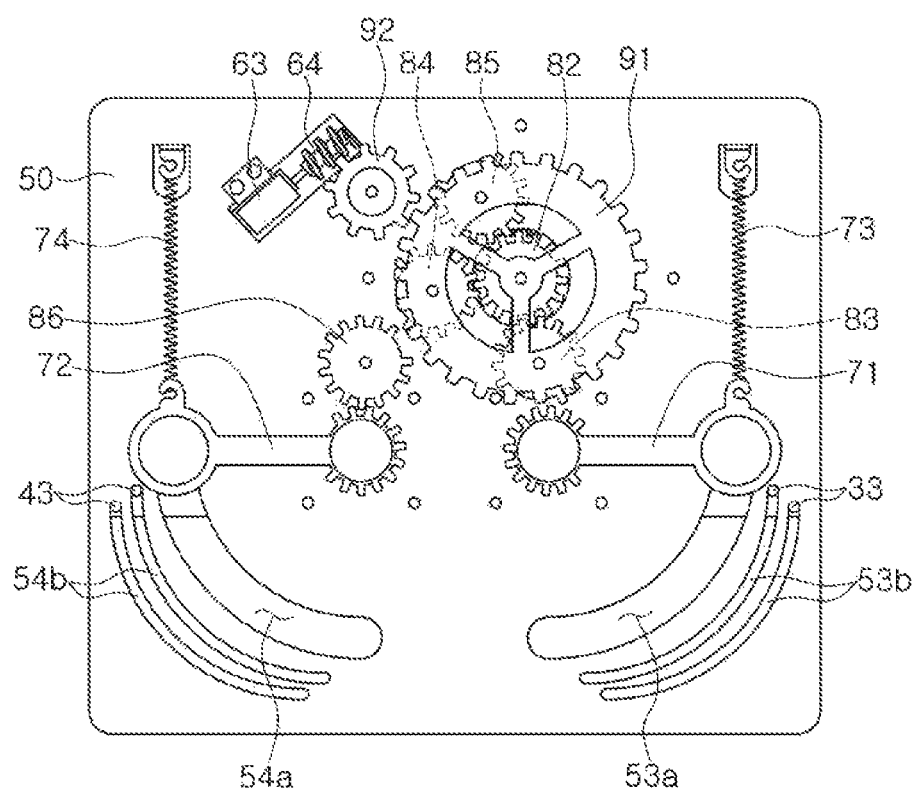
Figure 9A:
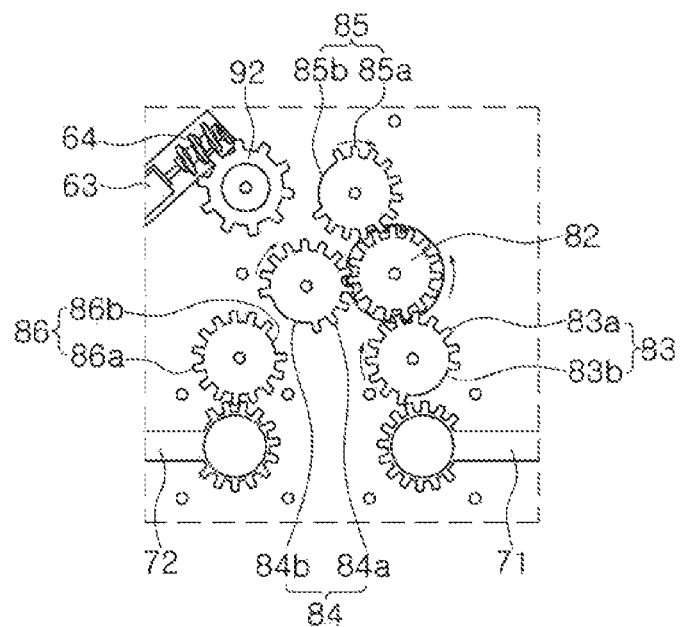
FIG. 9A is a view illustrating states of first to third sub gears according to one or more embodiments.
Figure 9B:
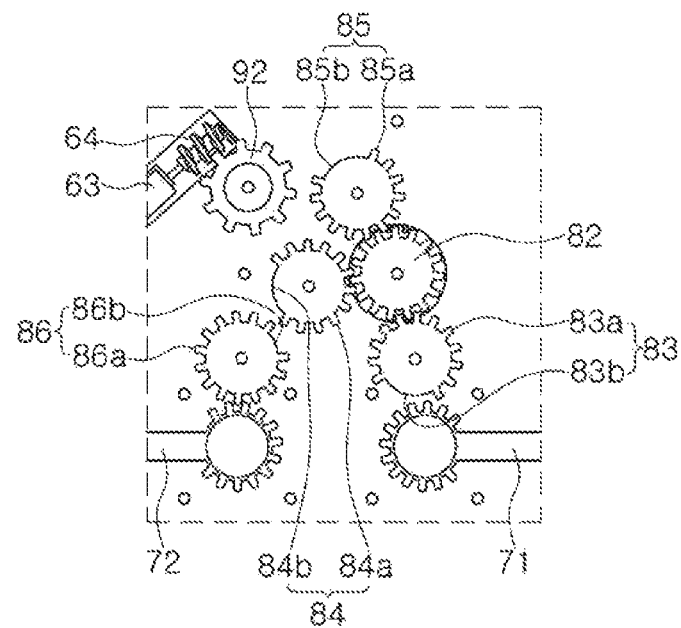
FIG. 9B is a view illustrating states of first to third sub gears according to one or more embodiments.

FIGS. 8A and 8B are views illustrating examples in which positions of first to third sub-gears are adjusted by a driving gear according to one or more embodiments. FIG. 9A is a view illustrating states of first to third sub gears (as shown in FIG. 8A, for example) according to one or more embodiments. FIG. 9B is a view illustrating states of first to third sub gears (as shown in FIG. 8B, for example) according to one or more embodiments.

Figure 10A:
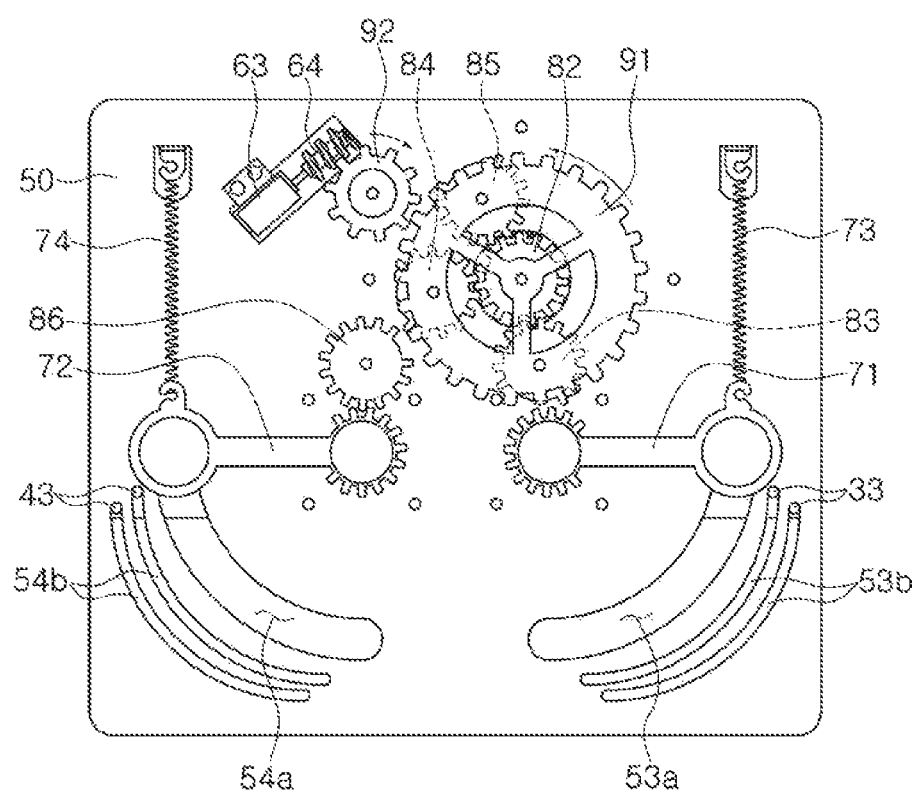
FIGS. 10A and 10B are views illustrating examples in which positions of first to third gears are adjusted by a first moving gear and a second moving gear according to one or more embodiments.
Figure 10B:
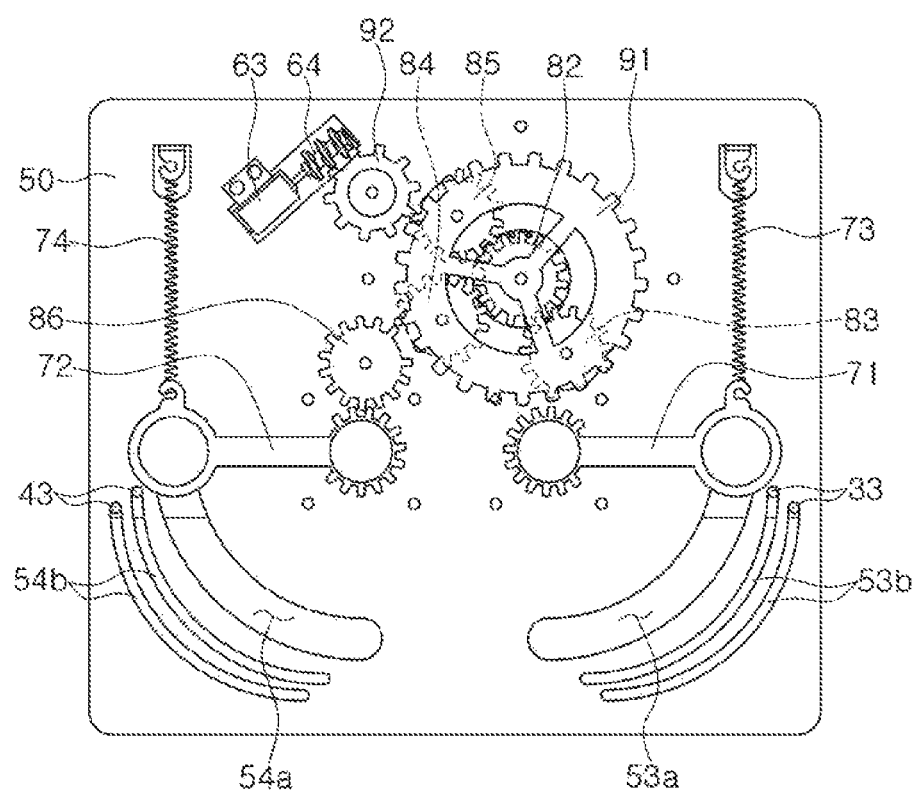
Figure 11A:
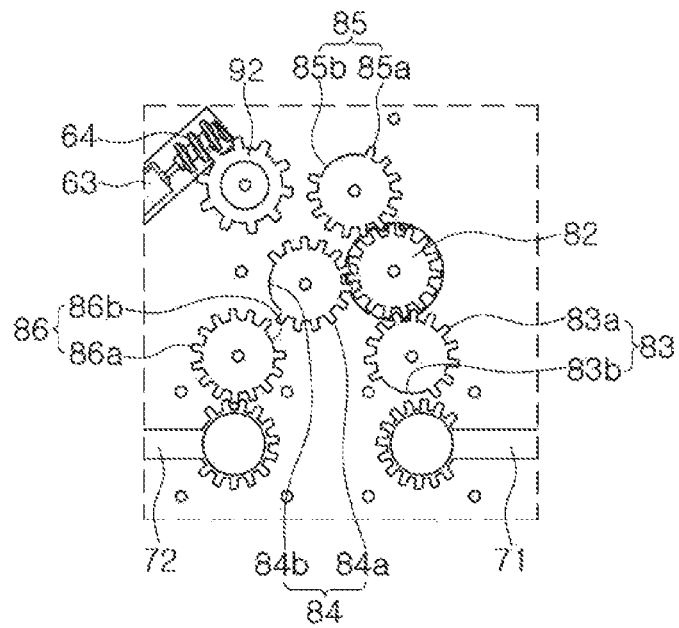
FIG. 11A is a view illustrating states of first to third sub gears according to one or more embodiments.
Figure 11B:
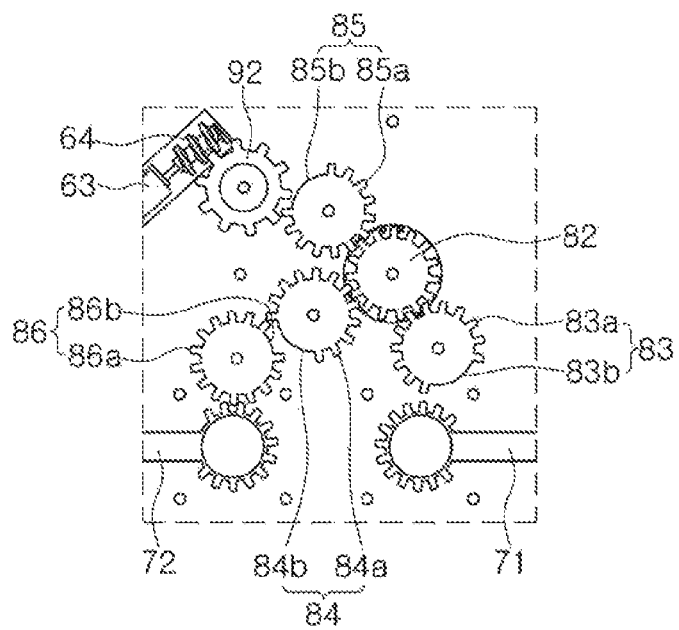
FIG. 11B is a view illustrating states of first to third sub gears according to one or more embodiments.

FIGS. 10A and 10B are views illustrating examples in which positions of first to third gears are adjusted by a first moving gear and a second moving gear according to one or more embodiments. FIG. 11A is a view illustrating states of first to third sub gears (as shown in FIG. 10A, for example) according to one or more embodiments. FIG. 11B is a view illustrating states of first to third sub gears (as shown in FIG. 10B, for example) according to one or more embodiments.

A process of adjusting positions of the first to third sub-gears 83, 84, and 85 (before the fourth camera 40 rotates, for example) will be described with reference to FIGS. 8A to 11B.

Positions of the first to third sub-gears 83, 84, and 85 may be adjusted to rotate the fourth camera 40. For example, the first to third sub-gears 83, 84, and 85 may move from a first position to a second position to rotate the fourth camera 40.

The adjustment of positions of the first to third sub gears 83, 84, and 85 may be performed in two steps. For example, when the first sub-gear 83 is disposed to be engaged with one side of the first link member 71 in a first position, a process of releasing the contact between the first sub-gear 83 and the first link member 71 may be performed (as shown in FIGS. 8A to 9B, as non-limiting examples), and thereafter, a process of moving the first to third sub-gears 83, 84, and 85 may be performed (as shown in FIGS. 10A to 11B, as non-limiting examples).

In other words, before the positions of the first to third sub-gears 83, 84, and 85 are changed by the first moving gear 91, the first to third sub-gears 83, 84, and 85 may rotate to release the engagement between the sawtooth portions 83a, 84a, 85a and either one or both of the first link member 71 and the spur gear 86.

Referring to FIGS. 8A to 9B, the driving gear 82 may rotate in the other direction (a counter-clockwise direction with reference to FIG. 9A) by the first driver 61 to release the contact between the first sub-gear 83 and the first link member 71. Since the first to third sub-gears 83, 84, and 85 are engaged with the driving gear 82, the first to third sub-gears 83, 84, and 85 may rotate in the one direction (a clockwise direction with reference to FIG. 9A) as the driving gear 82 rotates in the other direction.

Referring to FIG. 9A, the first sub-gear 83 may be disposed such that a portion in which the sawtooth portion 83a starts may be engaged with the one side of the first link member 71. When the first sub-gear 83 rotates in the one direction by the driving gear 82, the portion of the first sub-gear 83 in which the sawtooth portion 83a starts may move to be spaced apart from the one side of the first link member 71, and the arc portion 83b of the first sub-gear 83 may move to face the one side of the first link member 71 (as shown in FIG. 9B, as non-limiting examples). Accordingly, the engagement between the first sub-gear 83 and the first link member 71 may be released.

The arc portion 83b of the first sub-gear 83 may prevent interference between the first sub-gear 83 and the first link member 71 while the first sub-gear 83 moves. Accordingly, the first sub-gear 83 and the first link member 71 may not interfere with each other in the region in which the arc portion 83b of the first sub-gear 83 is disposed.

When driving gear 82 rotates in the other direction, the second and third sub-gears 84 and 85 may also rotate in one direction such that positions of the sawtooth portions 84a and 85a and the arc portions 84b and 85b of the second and third sub-gears 84 and 85 may change (as shown in FIGS. 9A and 9B, as non-limiting examples).

Referring to FIGS. 10A to 11B, the second moving gear 92 may rotate in the one direction (a clockwise direction with reference to FIG. 10A) by the second driver 63 to adjust positions of the first to third sub gears 83, 84, and 85, and accordingly, the first moving gear 91 may rotate in the other direction (a counter-clockwise direction with reference to FIG. 10A).

As the first to third sub gears 83, 84, and 85 are provided in the first moving gear 91, positions of the first to third sub gears 83, 84, and 85 may change when the first moving gear 91 rotates.

In FIGS. 11A and 11B, the first moving gear 91 is not illustrated to describe the example in which positions of the first to third sub gears 83, 84, and 85 change.

When the arc portion 83b of the first sub-gear 83 rotates to face the one side of the first link member 71, even when the first sub-gear 83 moves by rotation of the first moving gear 91, the first sub-gear 83 and the first link member 71 may not interfere with each other. Accordingly, the first sub-gear 83 may move to be spaced apart from the first link member 71.

The second sub-gear 84 may move to be engaged with the spur gear 86. In other words, when the second sub-gear 84 moves by rotation of the first moving gear 91, a portion of the second sub-gear 84 in which the sawtooth portion 84a starts may be disposed to be engaged with the sawtooth portion 86a of the spur gear 86.

The third sub-gear 85 may also move by rotation of the first moving gear 91.

The above-described position may be a second position of the first to third sub gears 83, 84, and 85 to only rotate the fourth camera 40.

In the second position, the first and third sub-gears 83 and 85 may not be engaged with the other elements other than the driving gear 82 (such as the first link member 71 and the spur gear 86, for example).

Figure 12A:
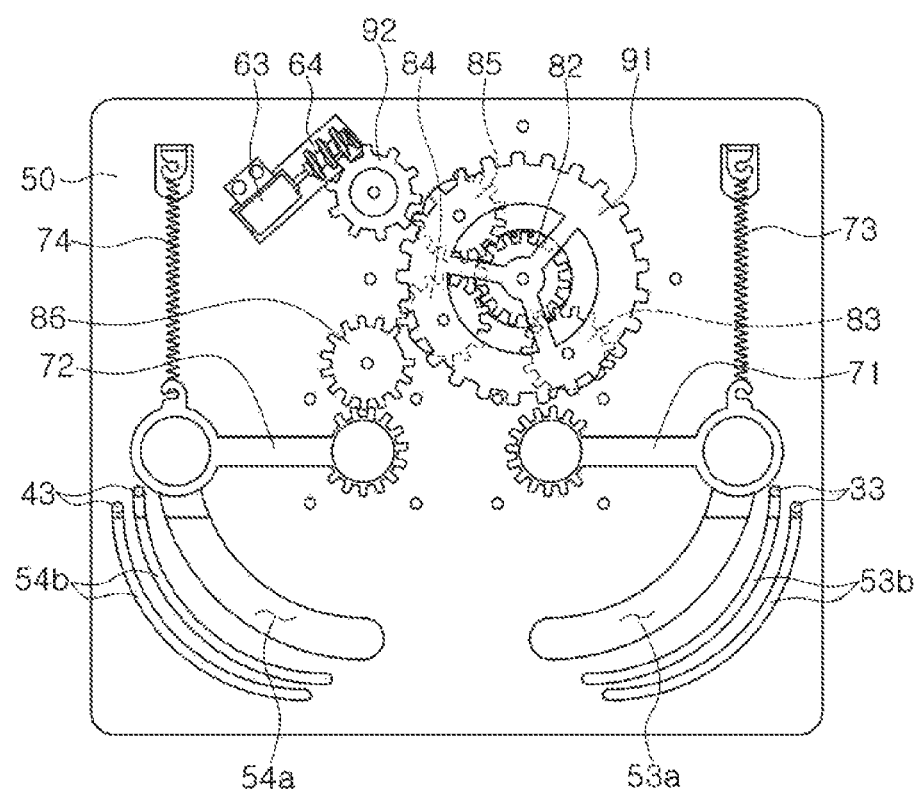
FIG. 12A is a bottom view illustrating a state in which first to fourth cameras of a camera module are disposed in an initial position according to one or more embodiments.
Figure 12B:
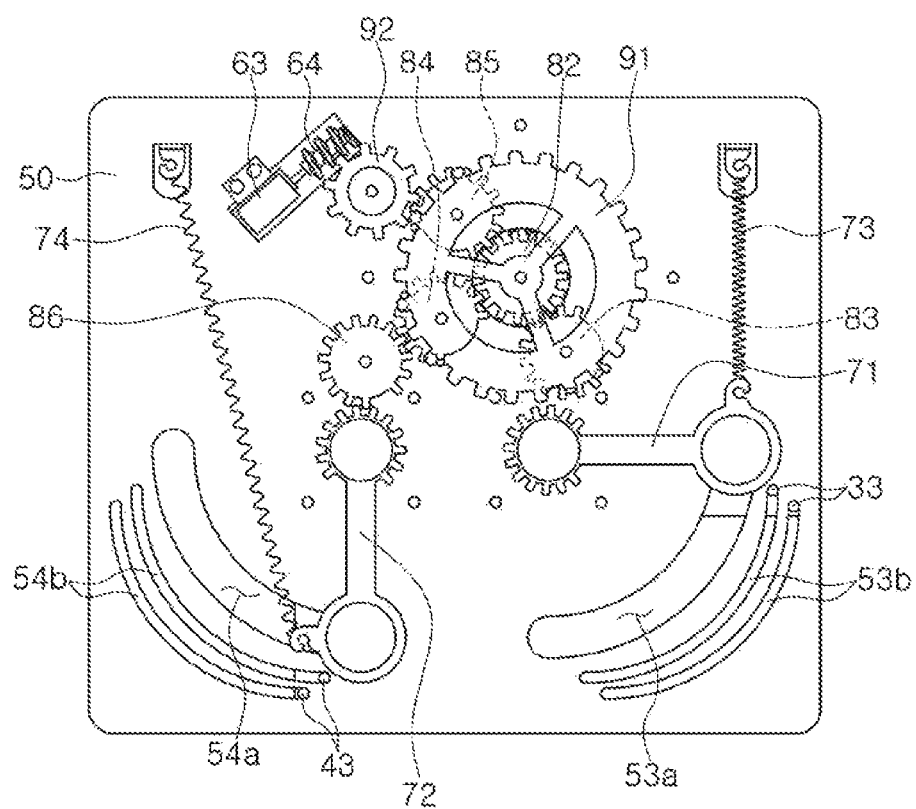
FIG. 12B is a bottom view illustrating a state in which a fourth camera of a camera module is moved from an initial position to a moving position according to one or more embodiments.

FIG. 12A is a bottom view illustrating a state in which first to fourth cameras of a camera module are disposed in an initial position according to one or more embodiments. FIG. 12B is a bottom view illustrating a state in which a fourth camera of a camera module is moved from an initial position to a moving position according to one or more embodiments.

Figure 13B:
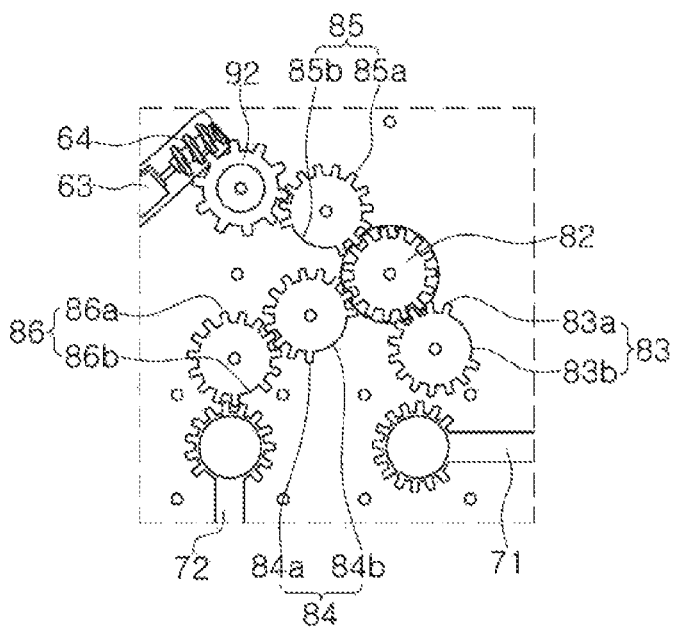
FIG. 13B is a view illustrating states of first to third sub gears according to one or more embodiments.

FIG. 13A is a view illustrating states of first to third sub gears (as shown in FIG. 12A, for example) according to one or more embodiments. FIG. 13B is a view illustrating states of first to third sub gears (as shown in FIG. 12B, for example) according to one or more embodiments.

In FIGS. 13A and 13B, the first moving gear 91 is not illustrated to describe the example in which the first to third sub gears 83, 84, and 85 operate.

FIG. 12A illustrates the example in which the first to fourth cameras 10 to 40 are disposed in an initial position. The initial position may refer to a position in which centers of the first to fourth cameras 10 to 40 are, or are substantially, disposed linearly.

FIG. 12B illustrates the example in which the fourth camera 40 is disposed in a moving position. The moving position may be a portion rotated from the initial position by 90°. However, in other examples, the moving position may refer to a position rotated from the initial position by less than 90° or more than 90°. When the fourth camera 40 is disposed in the moving position, a line connecting the centers of the first to fourth cameras 10 to 40 may form a triangle.

The fourth camera 40 may move from the initial position to the moving position by the driving gear 82, the second sub-gear 84, the spur gear 86, and the second link member 72.

When the fourth camera 40 rotates alone (when the third camera 30 does not rotate, for example), the first to third sub-gears 83, 84, and 85 may be disposed in a second position. For example, the second sub-gear 84 may be disposed adjacent to the spur gear 86. Also, the first and third sub-gears 83 and 85 may be disposed in a position which may be engaged with the driving gear 82 and may not interfere or engage with the other elements (such as the first link member 71 and the spur gear 86, for example).

Referring to FIG. 13A, the driving gear 82 may rotate in the one direction (a clockwise direction with reference to FIG. 13A) by the first driver 61. As the first to third sub-gears 83, 84, and 85 are engaged with the driving gear 82, the first to third sub-gears 83, 84, and 85 may rotate in the other direction (a counter-clockwise direction with reference to FIG. 13A) when the driving gear 82 rotates in the one direction. The other direction may refer to an opposite direction of the one direction.

The second sub-gear 84 may be disposed in a position adjacent to the spur gear 86. For example, the second sub-gear 84 may be disposed such that a portion in which the sawtooth portion 84a starts may be engaged with the spur gear 86.

Accordingly, when the second sub-gear 84 rotates in the other direction, the spur gear 86 may rotate in the one direction. As the spur gear 86 is engaged with the second link member 72, the second link member 72 may rotate (in the other direction, for example) by the spur gear 86.

Driving force of the first driver 61 may be transferred to the second link member 72 through the driving gear 82, the second sub-gear 84, and the spur gear 86 such that the second link member 72 may rotate, and accordingly, the fourth camera 40 connected to the other side of the second link member 72 may move from the initial position to the moving position.

As the first and third sub-gears 83 and 85 are engaged with the driving gear 82, the first and third sub-gears 83 and 85 may also rotate by the driving gear 82. However, when the first and third sub-gears 83 and 85 are disposed in positions which do not interfere or engage with the first link member 71 and the second link member 72, rotation of the first and third sub-gears 83 and 85 may not affect or rotate the first link member 71 and the second link member 72.

For example, when the fourth camera 40 rotates alone, the first and third sub-gears 83 and 85 may not be engaged with the other elements other than the driving gear 82 (such as the first link member 71 and the spur gear 86, for example).

Figure 14A:
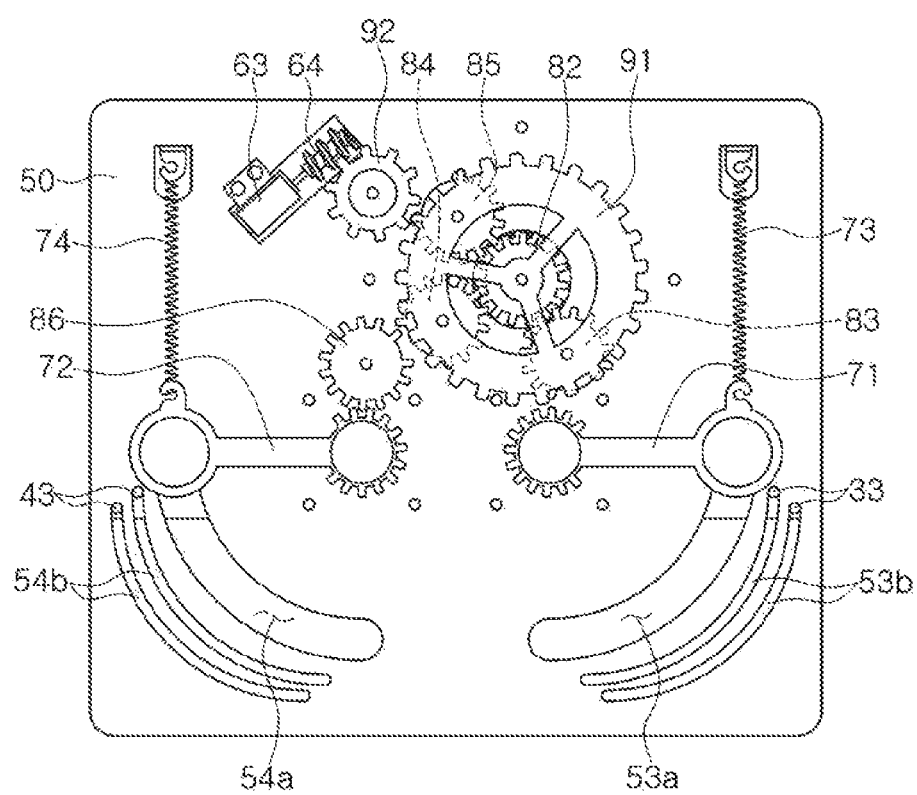
FIGS. 14A and 14B are views illustrating examples in which positions of first to third sub-gears are adjusted by a driving gear according to one or more embodiments.
Figure 14B:
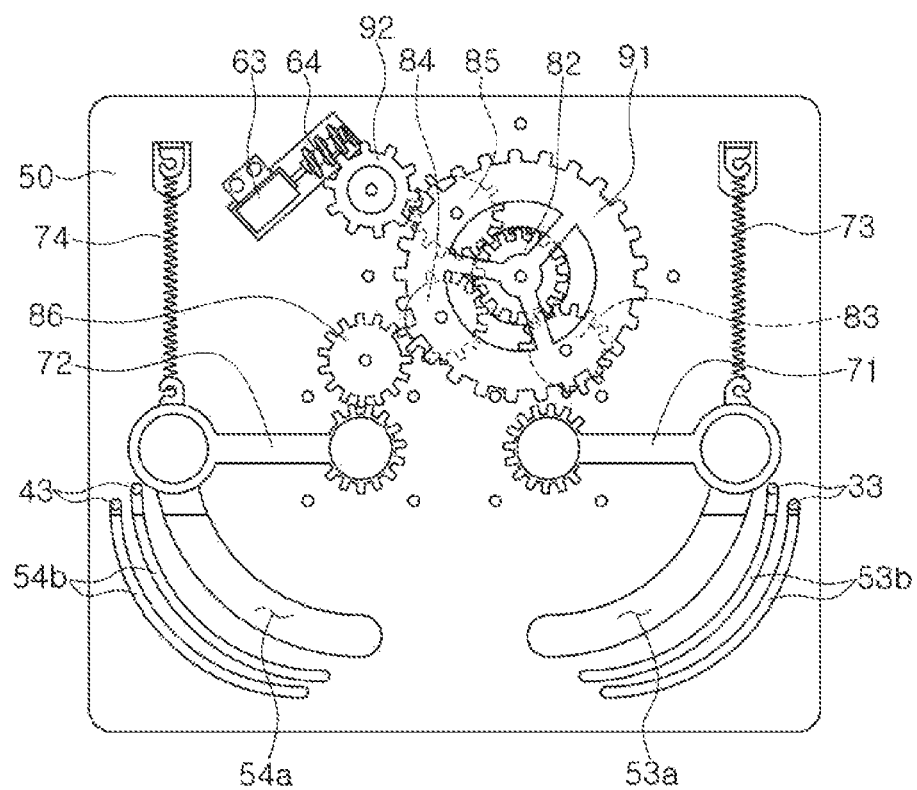
Figure 15A:
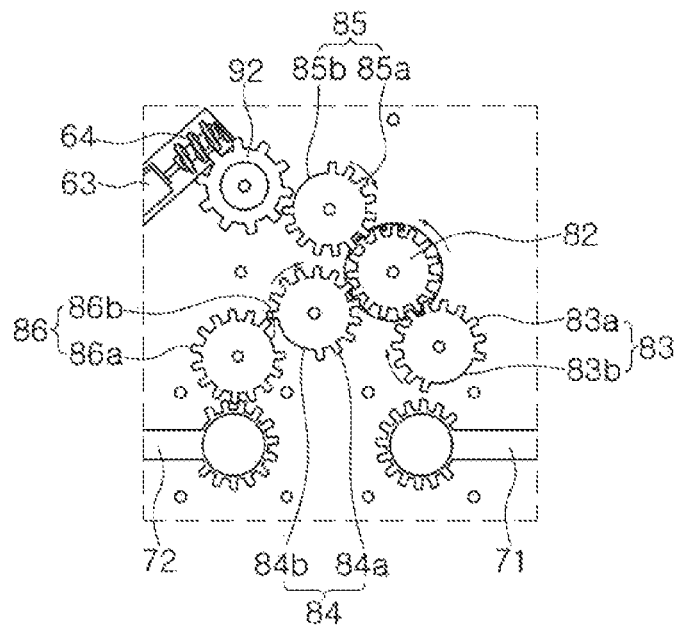
FIG. 15A is a view illustrating states of first to third sub gears according to one or more embodiments.
Figure 15B:
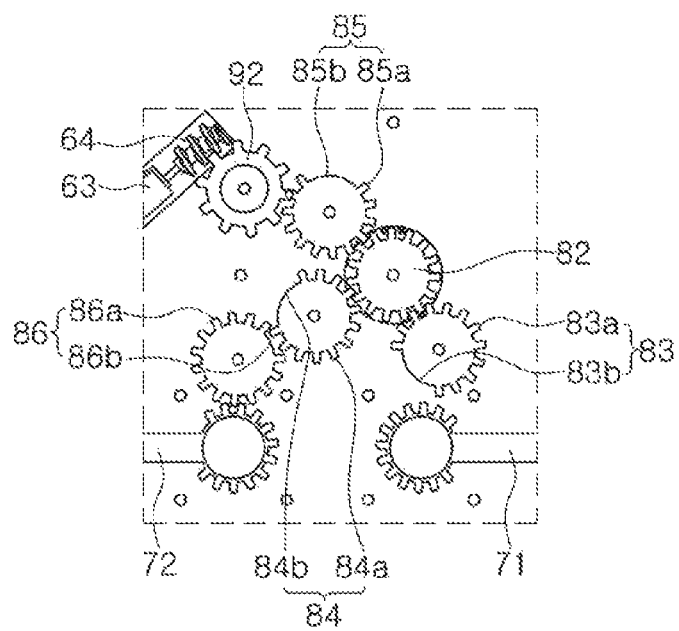
FIG. 15B is a view illustrating states of first to third sub gears according to one or more embodiments.

FIGS. 14A and 14B are views illustrating examples in which positions of first to third sub-gears are adjusted by a driving gear according to one or more embodiments. FIG. 15A is a view illustrating states of first to third sub gears (as shown in FIG. 14A, for example) according to one or more embodiments. FIG. 15B is a view illustrating states of first to third sub gears (as shown in FIG. 14B, for example) according to one or more embodiments.

Figure 16A:
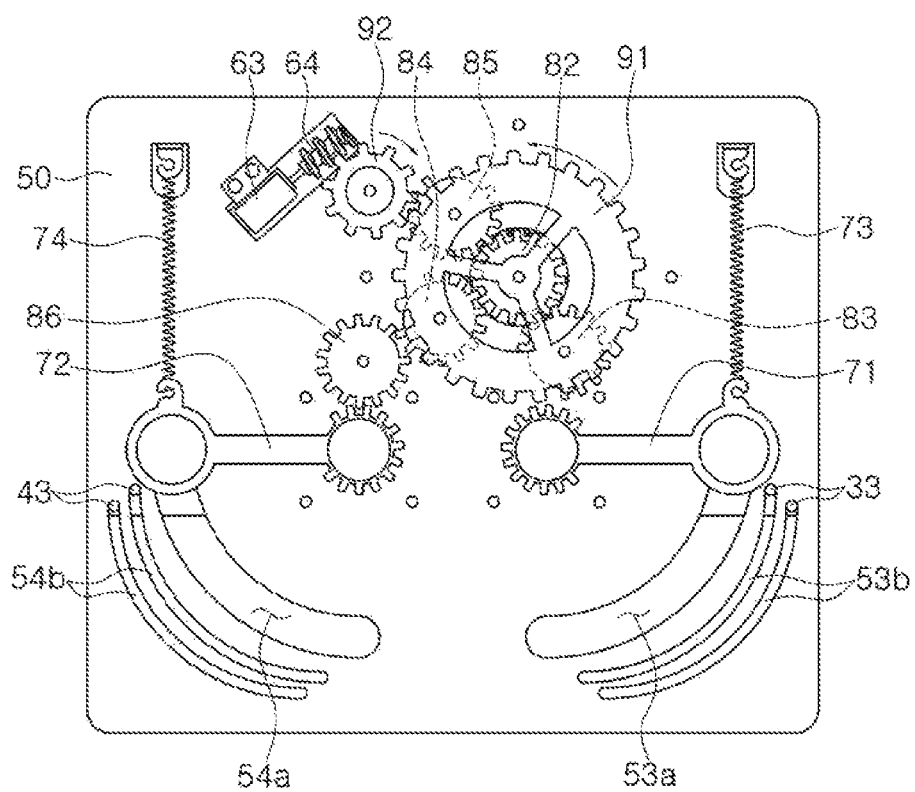
FIGS. 16A and 16B are views illustrating examples in which positions of first to third gears are adjusted by a first moving gear and a second moving gear according to one or more embodiments.
Figure 16B:
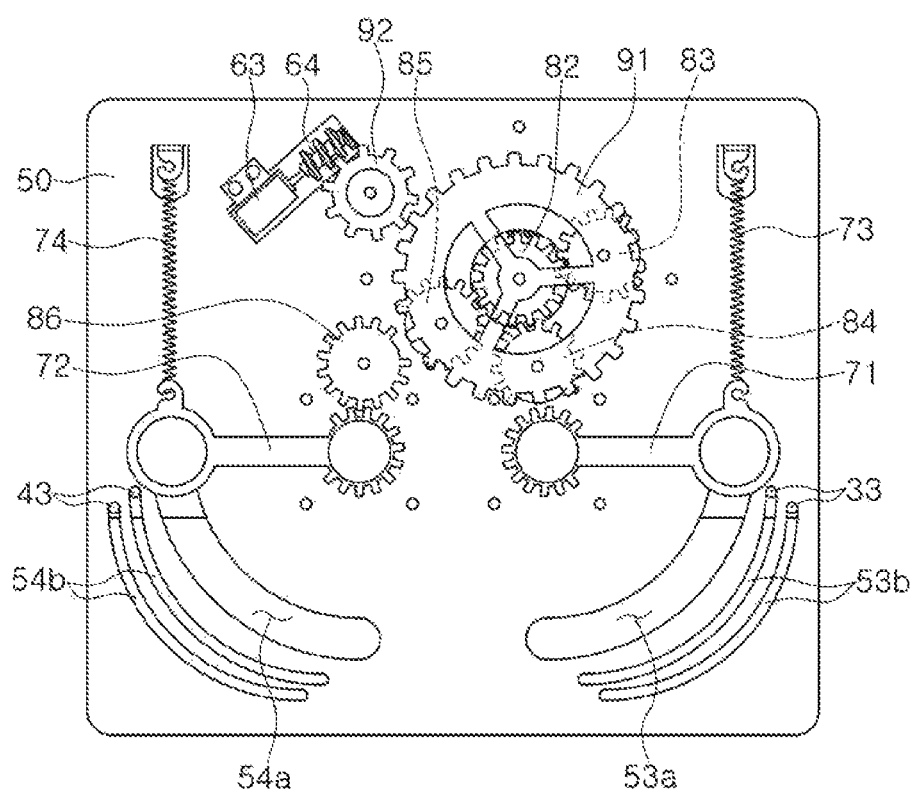
Figure 17A:
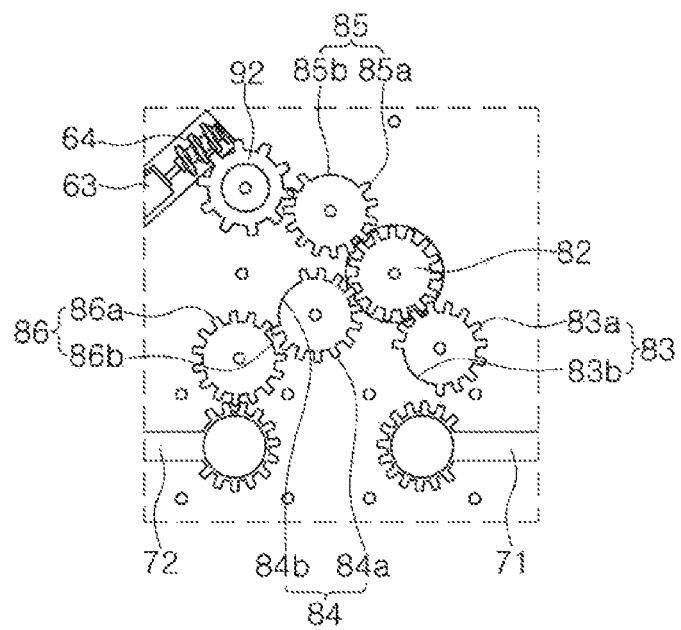
FIG. 17A is a view illustrating states of first to third sub gears according to one or more embodiments.
Figure 17B:
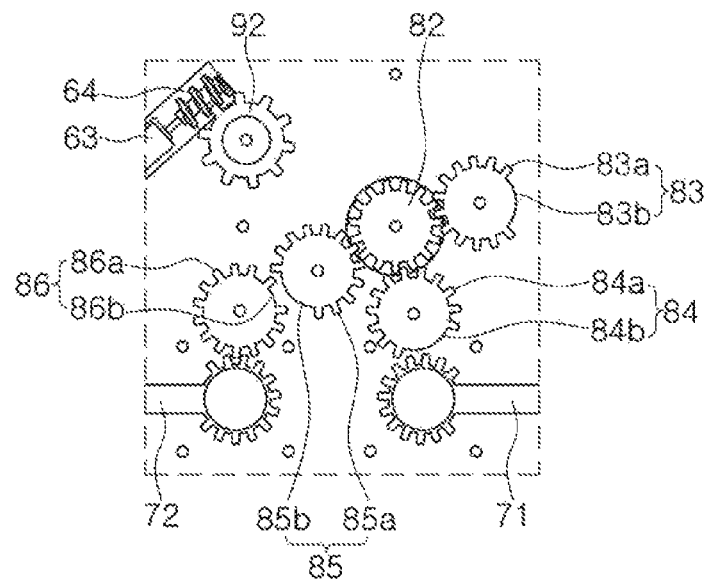
FIG. 17B is a view illustrating states of first to third sub gears according to one or more embodiments.

FIGS. 16A and 16B are views illustrating examples in which positions of first to third gears are adjusted by a first moving gear and a second moving gear according to one or more embodiments. FIG. 17A is a view illustrating states of first to third sub gears (as shown in FIG. 16A, for example) according to one or more embodiments. FIG. 17B is a view illustrating states of first to third sub gears (as shown in FIG. 16B, for example) according to one or more embodiments.

A process of adjusting positions of the first to third sub-gears 83, 84, and 85 to rotate the third camera 30 and the fourth camera 40 together will be described with reference to FIGS. 14A to 17B.

The positions of the first to third sub-gears 83, 84, and 85 may be adjusted to rotate the third camera 30 and the fourth camera 40 together. For example, to rotate the third camera 30 and the fourth camera 40 together, the first to third sub-gears 83, 84, and 85 may move from the second position to the third position.

The adjustment of positions of the first to third sub-gears 83, 84, and 85 may be performed in two steps. For example, when the second sub-gear 84 is disposed to be engaged with the spur gear 86 in the second position, a process of releasing the contact between the second sub-gear 84 and the spur gear 86 may be performed (as shown in FIGS. 14A to 15B, as non-limiting examples), and thereafter, a process of moving the first to third sub-gears 83, 84, and 85 may be performed (as shown in FIGS. 16A to 17B, as non-limiting examples).

In other words, the first to third sub-gears 83, 84, and 85 may rotate to release the engagement between the sawtooth portions 83a, 84a, and 85a and the first link member 71 or the spur gear 86 before the positions of the first to third sub-gears 83, 84, and 85 change by the first moving gear 91.

Referring to FIGS. 14A to 15B, the driving gear 82 may rotate in the other direction (a counter-clockwise direction with reference to FIG. 15A) by the first driver 61 to release the contact between the second sub-gear 84 and the spur gear 86. As the first to third sub-gears 83, 84, and 85 are engaged with the driving gear 82, the first to third sub-gears 83, 84, and 85 may rotate in the one direction (a clockwise direction with reference to FIG. 15A) when the driving gear 82 rotates in the other direction.

Referring to FIG. 15A, the second sub-gear 84 may be disposed such that a portion in which the sawtooth portion 84a starts may be engaged with the spur gear 86. When the second sub-gear 84 rotates in the one direction by the driving gear 82, the portion of the second sub-gear 84 in which the sawtooth portion 84a starts may move to be spaced apart from the spur gear 86 (as shown in FIG. 15B, as a non-limiting example). Accordingly, the engagement between the second sub-gear 84 and the spur gear 86 may be released.

The arc portion 84b of the second sub-gear 84 and the sawtooth portion 86b of the spur gear 86 may prevent interference or engagement between the second sub-gear 84 and the spur gear 86 while the second sub-gear 84 moves. Accordingly, the second sub-gear 84 and the spur gear 86 may not interfere or engage with each other in a region in which the arc portion 84b of the second sub-gear 84 and the sawtooth portion 86b of the spur gear 86 are disposed.

When the driving gear 82 rotates in the other direction, the first and third sub-gears 83 and 85 may rotate in one direction such that positions of the sawtooth portions 83a and 85a and positions of the arc portions 83b and 85b of the first and third sub-gears 83 may change (as shown in FIGS. 15A and 15B, as non-limiting examples).

In FIG. 15B, the second moving gear 92 may partially overlap the third sub-gear 85, but as the third sub-gear 85 is disposed below the second moving gear 92, the second moving gear 92 and the third sub-gear 85 may not engaged with each other.

Referring to FIGS. 16A to 17B, the second moving gear 92 may rotate in the one direction (a clockwise direction with reference to FIG. 16A) by the second driver 63 to adjust positions of the first to third sub gears 83, 84, and 85, and accordingly, the first moving gear 91 may rotate in the other direction (a counter-clockwise direction with reference to FIG. 16A).

As the first to third sub gears 83, 84, and 85 are provided in the first moving gear 91, positions of the first to third sub gears 83, 84, and 85 may change when the first moving gear 91 rotates.

In FIGS. 17A and 17B, the first moving gear 91 is not illustrated to describe the example in which positions of the first to third sub gears 83, 84, and 85 change.

When the second sub-gear 84 is rotated to release the engagement between the second sub-gear 84 and the spur gear 86, even when the second sub-gear 84 moves by rotation of the first moving gear 91, the second sub-gear 84 and the spur gear 86 may not interfere with each other. Accordingly, the second sub-gear 84 may move to be spaced apart from the spur gear 86.

The second sub-gear 84 may move to be engaged with the one side of the first link member 71. Accordingly, when the second sub-gear 84 moves by rotation of the first moving gear 91, a portion of the second sub-gear 84 in which the sawtooth portion 84a starts may be disposed to be engaged with one side of the first link member 71.

The third sub-gear 85 may move to be engaged with the spur gear 86. In other words, when the third sub-gear 85 moves by rotation of the first moving gear 91, a portion of the third sub-gear 85 in which the sawtooth portion 85a starts may be disposed to be engaged with the sawtooth portion 86a of the spur gear 86.

The first sub-gear 83 may also move by rotation of the first moving gear 91.

The above-described position may be a third position of the first to third sub-gears 83, 84, and 85 to rotate the third camera 30 and the fourth camera 40 together.

In the third position, the first sub-gear 83 may not be engaged with elements other than the driving gear 82 (such as the first link member 71 and the spur gear 86, for example).

Figure 18A:
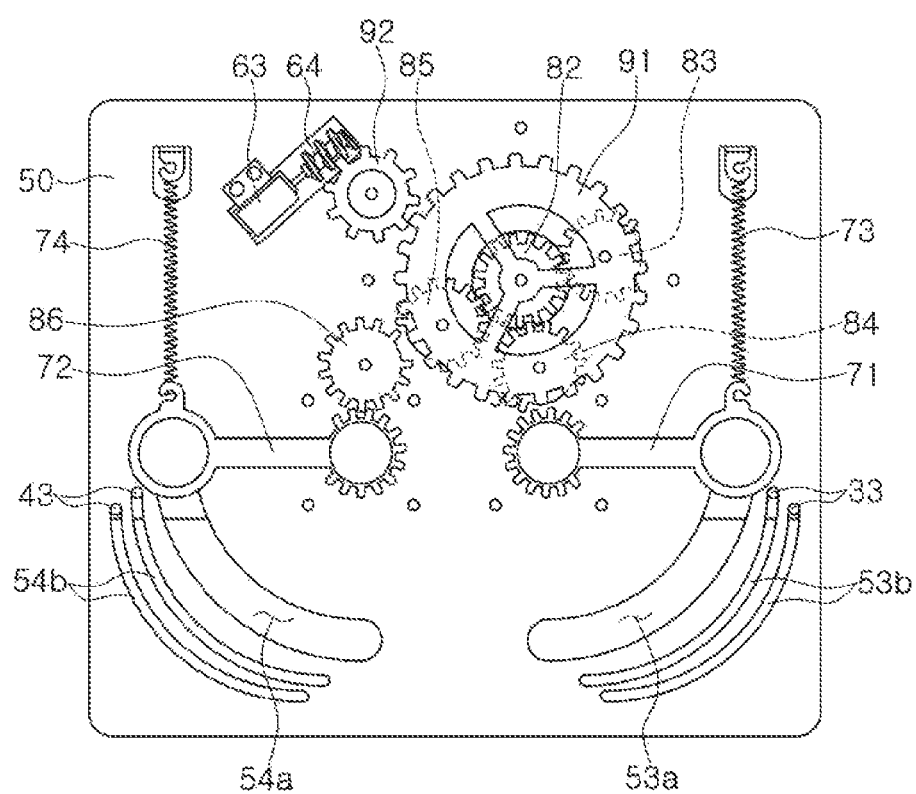
FIG. 18A is a bottom view illustrating a state in which first to fourth cameras of a camera module are disposed in an initial position according to one or more embodiments.
Figure 18B:
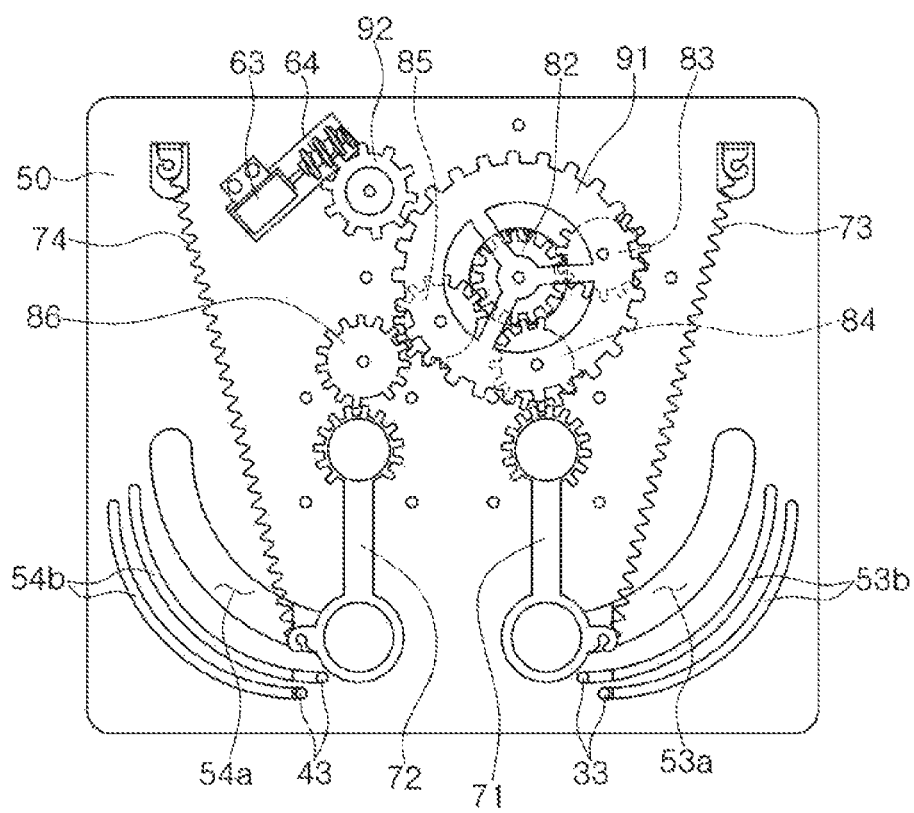
FIG. 18B is a bottom view illustrating a state in which a third camera and a fourth camera of a camera module are moved from an initial position to a moving position together according to one or more embodiments.

FIG. 18A is a bottom view illustrating a state in which first to fourth cameras of a camera module are disposed in an initial position according to one or more embodiments. FIG. 18B is a bottom view illustrating a state in which a third camera and a fourth camera of a camera module are moved from an initial position to a moving position according to one or more embodiments.

Figure 19B:
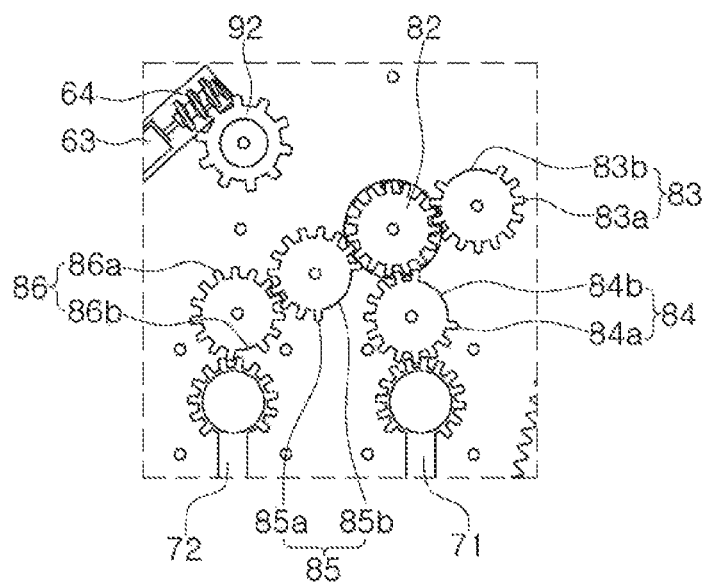
FIG. 19B is a view illustrating states of first to third sub gears according to one or more embodiments.

FIG. 19A is a view illustrating states of first to third sub gears (as shown in FIG. 18A, for example) according to one or more embodiments. FIG. 19B is a view illustrating states of first to third sub gears (as shown in FIG. 18B, for example) according to one or more embodiments.

In FIGS. 19A and 19B, the first moving gear 91 is not illustrated to describe operation of the first to third sub gears 83, 84, and 85.

FIG. 18A illustrates the example in which the first to fourth cameras 10 to 40 are disposed in an initial position. The initial position may refer to a position in which centers of the first to fourth cameras 10 to 40 are, or are substantially, disposed linearly.

FIG. 18B illustrates the example in which the third camera 30 and the fourth camera 40 are disposed in a moving position. The moving position may refer to a position rotated from the initial position by 90°. However, in other examples, the moving position may refer to a position rotated from the initial position by less than 90° or more than 90°. When the third camera 30 and the fourth camera 40 are disposed in the moving position, a line connecting centers of the first to fourth cameras 10 to 40 may form a rectangle.

The third camera 30 may move from the initial position to the moving position by the driving gear 82, the second sub-gear 84, and the first link member 71.

The fourth camera 40 may move from the initial position to the moving position by the driving gear 82, the third sub-gear 85, the spur gear 86, and the second link member 72.

When the third camera 30 and the fourth camera 40 rotate together, the first to third sub-gears 83, 84, and 85 may be disposed in the third position. For example, the second sub-gear 84 may be disposed adjacent to the first link member 71, and the third sub-gear 85 may be disposed adjacent to the spur gear 86. The first sub-gear 83 may be disposed in a position which may be engaged with the driving gear 82 and may not interfere or engage with the other elements (such as the first link member 71 and the spur gear 86, for example).

Referring to FIG. 19A, the driving gear 82 may rotate in the one direction (a clockwise direction with reference to FIG. 19A) by the first driver 61. As the first to third sub-gears 83, 84, and 85 are engaged with the driving gear 82, the first to third sub-gears 83, 84, and 85 may rotate in the other direction (a counter-clockwise direction with reference to FIG. 19A) when the driving gear 82 rotates in the one direction. The other direction may refer to an opposite direction of the one direction.

The second sub-gear 84 may be disposed in a position adjacent to the first link member 71. For example, a portion of the second sub-gear 84 in which the sawtooth portion 84a starts may be disposed to be engaged with the one side of the first link member 71.

Accordingly, when the second sub-gear 84 rotates in the other direction, the second sub-gear 84 may be engaged with the first link member 71 such that the first link member 71 may rotate in the one direction.

Driving force of the first driver 61 may be transferred to the first link member 71 through the driving gear 82 and the second sub-gear 84 such that the first link member 71 may rotate, and accordingly, the third camera 30 connected to the other side of the first link member 71 may move from the initial position to the moving position.

The third sub-gear 85 may be disposed in a position adjacent to the spur gear 86. For example, the third sub-gear 85 may be disposed such that a portion in which the sawtooth portion 85a starts may be engaged with the spur gear 86.

Accordingly, when the third sub-gear 85 rotates in the other direction, the spur gear 86 may rotate in the one direction. Since the spur gear 86 is engaged with the second link member 72, the second link member 72 may rotate (in the other direction, for example) by the spur gear 86.

The driving force of the first driver 61 may be transferred to the second link member 72 through the driving gear 82, the third sub-gear 85, and the spur gear 86 such that the second link member 72 may rotate, and accordingly, the fourth camera 40 connected to the other side of the second link member 72 may move from the initial position to the moving position.

Since the first sub-gear 83 is also engaged with the driving gear 82, the first sub-gear 83 may also rotate by the driving gear 82. However, since the first sub-gear 83 is disposed in a region which may not interfere or engage with the first link member 71 and the second link member 72, the rotation of the first sub-gear 83 may not affect or rotate the first link member 71 and the second link member 72.

For example, when the third camera 30 and the fourth camera 40 are rotated together, the first sub-gear 83 may not be engaged with the other elements other than the driving gear 82 (such as the first link member 71 and the spur gear 86, for example).

Figure 20A:
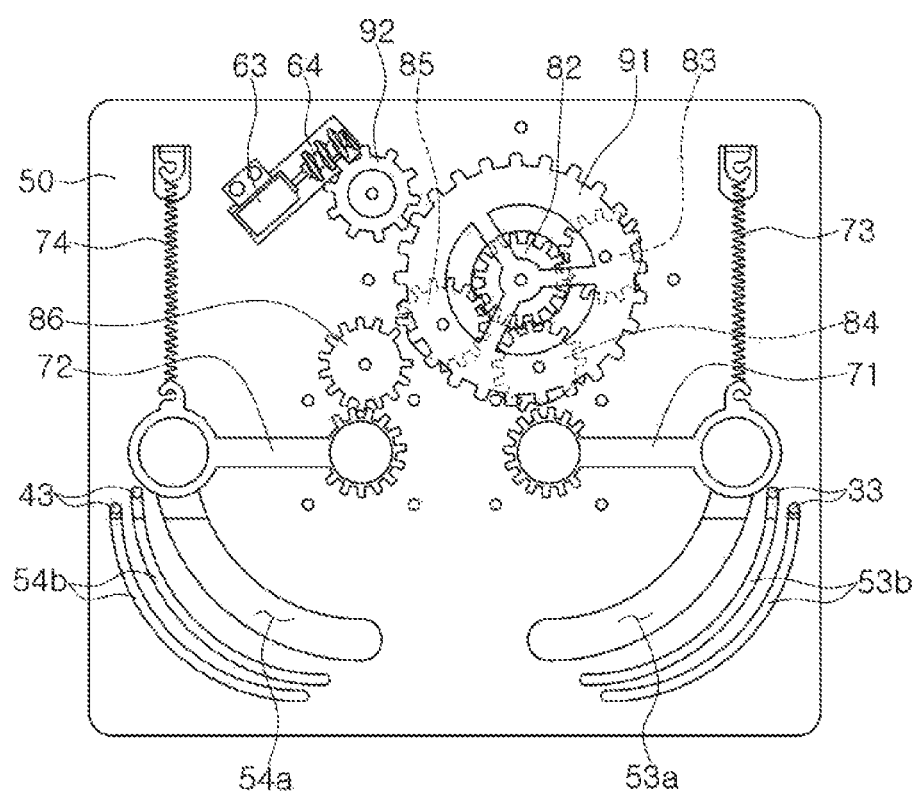
FIG. 20A is a bottom view illustrating a state in which first to fourth cameras of a camera module are disposed in an initial position according to one or more embodiments.
Figure 20B:
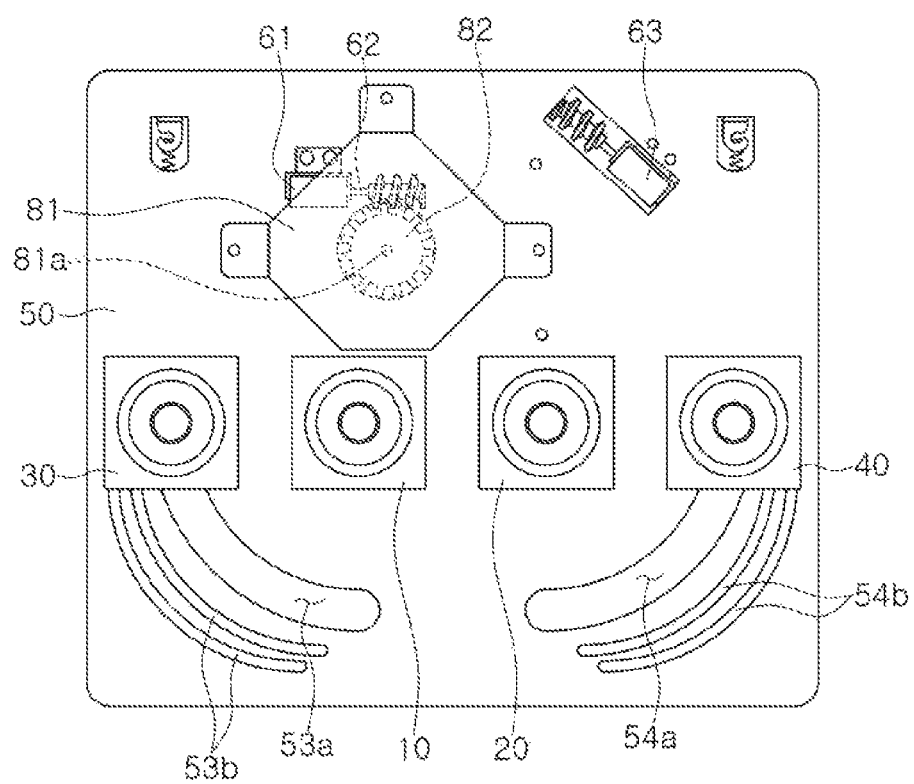
FIG. 20B is a plan view illustrating a state in which first to fourth cameras of a camera module are disposed in an initial position according to one or more embodiments.

FIG. 20A is a bottom view illustrating a state in which first to fourth cameras of a camera module are disposed in an initial position according to one or more embodiments. FIG. 20B is a plan view (a plan view of FIG. 20A, for example) according to one or more embodiments.

Figure 21A:
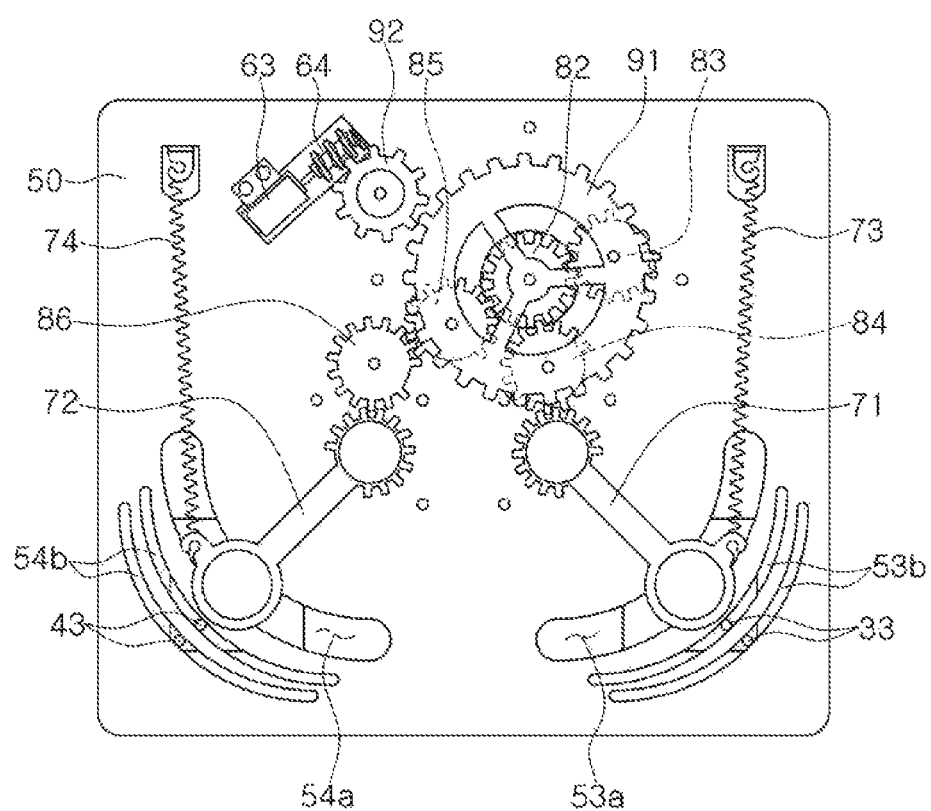
FIG. 21A is a bottom view illustrating a state in which a third camera and a fourth camera of a camera module are moved from an initial position to a moving position according to one or more embodiments.
Figure 21B:
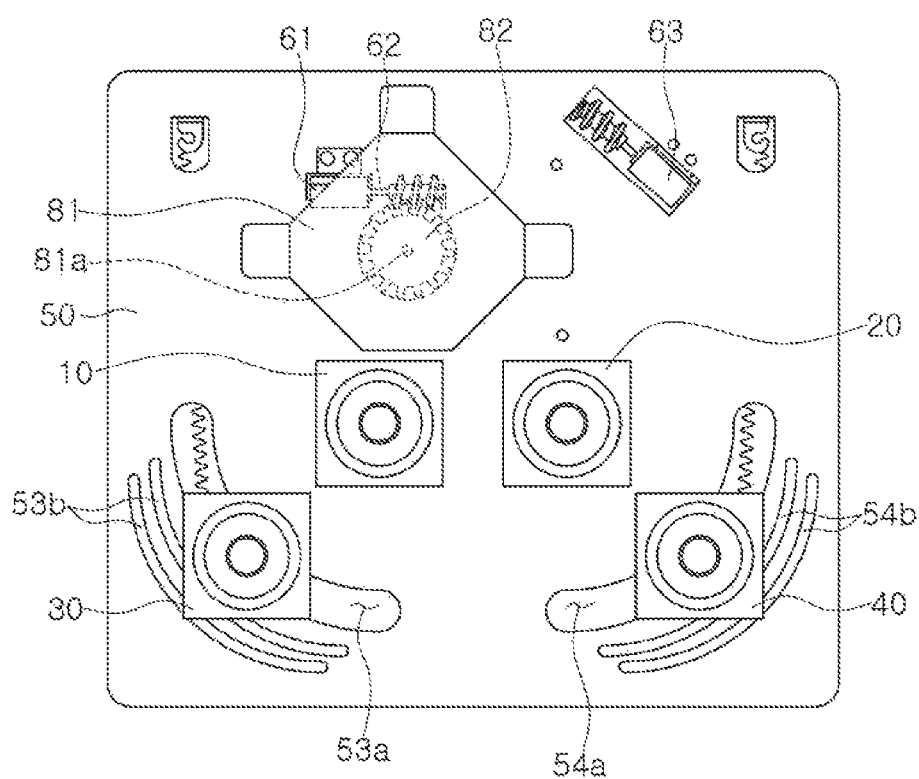
FIG. 21B is a plan view illustrating a state in which a third camera and a fourth camera of a camera module are moved from an initial position to a moving position according to one or more embodiments.

FIG. 21A is a bottom view illustrating a state in which a third camera and a fourth camera of a camera module are moved from an initial position to a moving position according to one or more embodiments. FIG. 21B is a plan view (a plan view of FIG. 21A, for example) according to one or more embodiments.

Figure 22A:
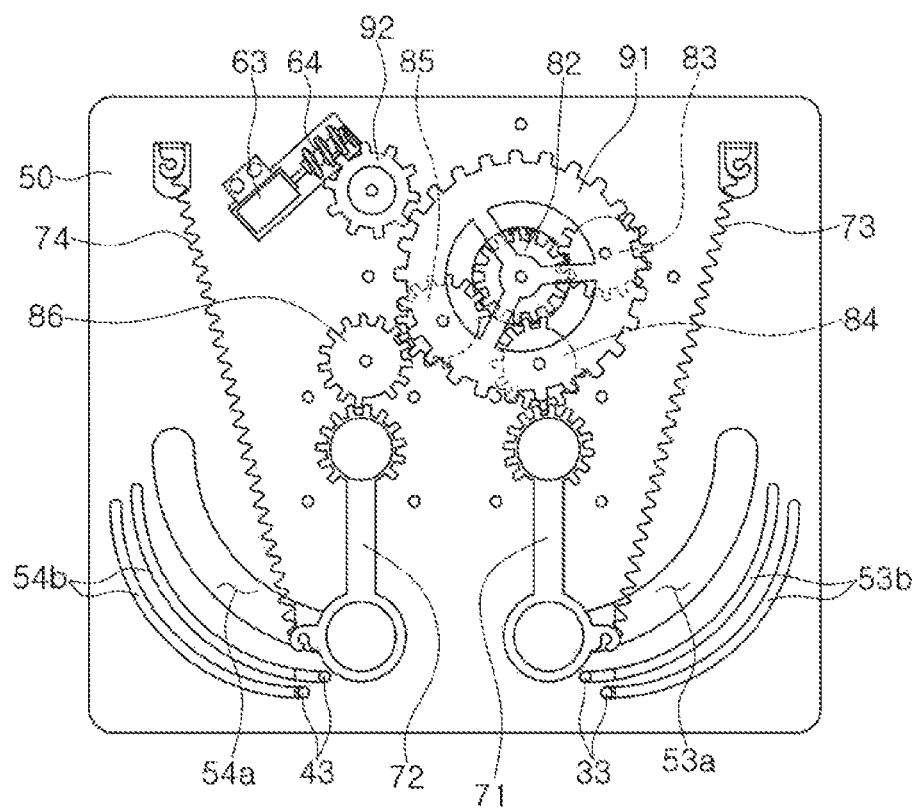
FIG. 22A is a bottom view illustrating a state in which a third camera and a fourth camera of a camera module are disposed in a moving position according to one or more embodiments.
Figure 22B:
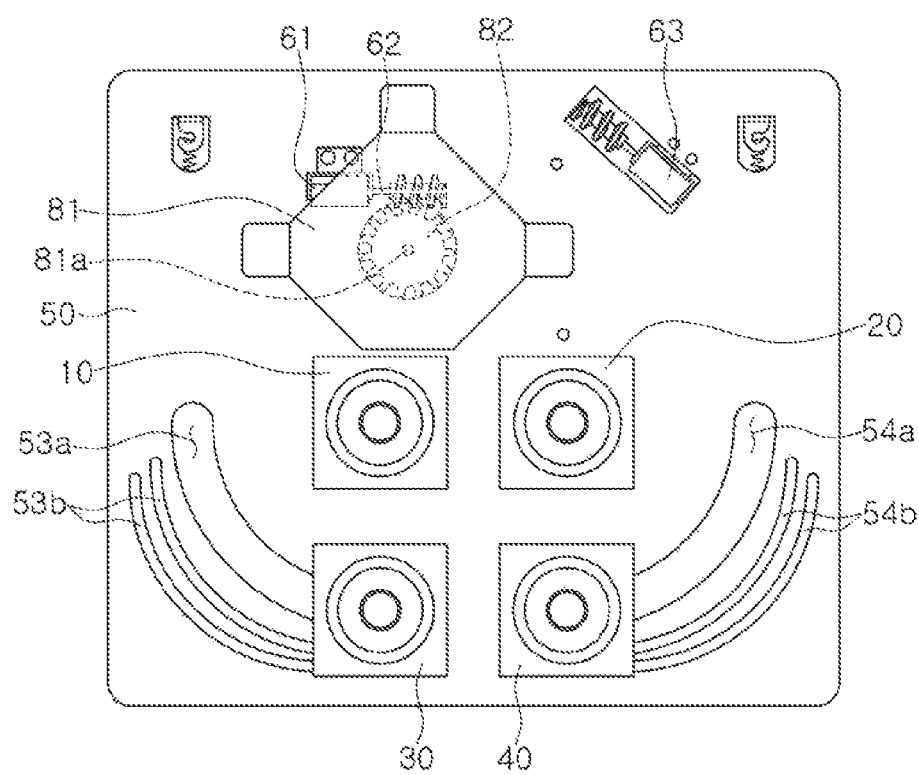
FIG. 22B is a plan view illustrating a state in which a third camera and a fourth camera of a camera module are disposed in a moving position according to one or more embodiments.

FIG. 22A is a bottom view illustrating a state in which a third camera and a fourth camera of a camera module are disposed in a moving position according to one or more embodiments. FIG. 22B is a plan view (a plan view of FIG. 22A, for example) according to one or more embodiments.

FIGS. 20A and 20B illustrate the example in which the first to fourth cameras 10 to 40 are disposed in an initial position. The initial position may refer to a position in which centers of the first to fourth cameras 10 to 40 are, or are substantially, disposed linearly.

FIGS. 22A and 22B illustrate the example in which the third camera 30 and the fourth camera 40 are disposed in a moving position. The moving position may refer to a position rotated from the initial position by 90°. However, in other examples, the moving position may refer to a position rotated from the initial position by less than 90° or more than 90°. When the third camera 30 and the fourth camera 40 are disposed in the moving position, a line connecting centers of the first to fourth cameras 10 to 40 may form a rectangle.

FIGS. 21A and 21B illustrate the example in which the third camera 30 and the fourth camera 40 are disposed in a position (a random position, for example) between the initial position and the moving position.

As illustrated in FIGS. 20A to 22B, the third camera 30 and the fourth camera 40 may rotatably move between the initial position and the moving position.

Referring to FIGS. 20A to 22B, a curvature of the first guide hole 53a and a curvature of the first guide rail 53b may be different from each other.

A length of the first guide hole 53a and a length of the first guide rail 53b may be different from each other. For example, a length of the first guide rail 53b may be shorter than a length of the first guide hole 53a.

The third protrusion 31 of the third camera 30 may move along the first guide hole 53a, and a first guide projection 33 of the third camera 30 may move along the first guide rail 53b.

When a curvature of the first guide hole 53a and a curvature of the first guide rail 53b are different from each other, the third camera 30 may rotate with reference to the first camera 10, and may not rotate with reference to a center of the third camera 30. In other words, the third camera 30 may revolve around the first camera 10, but may not rotate.

Each of the first to fourth cameras 10 to 40 may include an image sensor, where each image sensor has a rectangular shape. Accordingly, each image sensor may have a long side and a short side.

When the third camera 30 is rotated with reference to the first camera 10, as the third camera 30 does not rotate with reference to the center of the third camera 30, arrangement of the image sensor of the third camera 30 may be the same in the initial position and the moving position.

For example, the long side of the image sensor of the third camera 30 in the initial position and the long side of the image sensor of the third camera 30 in the moving position may be parallel to each other.

A curvature of the second guide hole 54a and a curvature of the second guide rail 54b may also be different from each other.

A length of the second guide hole 54a and a length of the second guide rail 54b may be different from each other. For example, a length of the second guide rail 54b may be shorter than a length of the second guide hole 54a.

The fourth protrusion 41 of the fourth camera 40 may move along the second guide hole 54a, and the second guide projection 43 of the fourth camera 40 may move along the second guide rail 54b.

When a curvature of the second guide hole 54a and a curvature of the second guide rail 54b are different from each other, the fourth camera 40 may rotate with reference to the second camera 20, and may not rotate with reference to a center of the fourth camera 40. In other words, the fourth camera 40 may revolve around the second camera 20 but may not rotate.

When the fourth camera 40 is rotated with reference to the second camera 20, as the fourth camera 40 may not rotate with reference to the center of the fourth camera 40, arrangement of the image sensor of the fourth camera 40 may be the same in the initial position and the moving position.

For example, the long side of the image sensor of the fourth camera 40 in the initial position and the long side of the image sensor of the fourth camera 40 in the moving position may be parallel to each other.

Figure 24A:
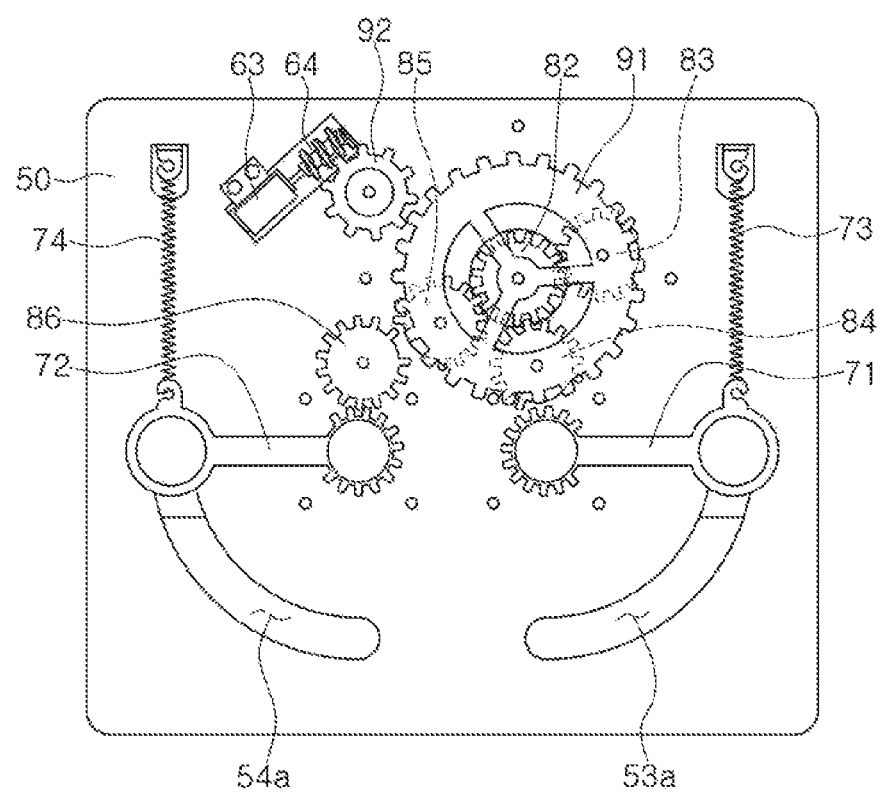
FIG. 24A is a bottom view illustrating a state in which first to fourth cameras of a camera module are disposed in an initial position according to one or more embodiments.
Figure 24B:
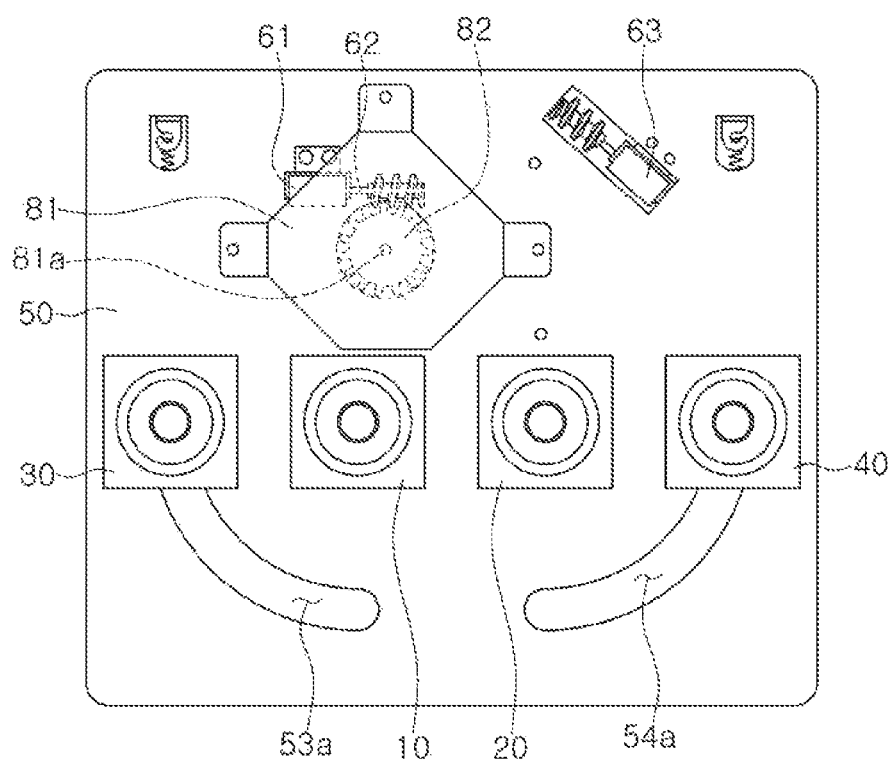
FIG. 24B is a plan view illustrating a state in which first to fourth cameras of a camera module are disposed in an initial position according to one or more embodiments.

FIG. 24A is a bottom view illustrating a state in which first to fourth cameras of a camera module are disposed in an initial position according to one or more embodiments. FIG. 24B is a plan view (a plan view of FIG. 24A, for example) according to one or more embodiments.

Figure 25A:
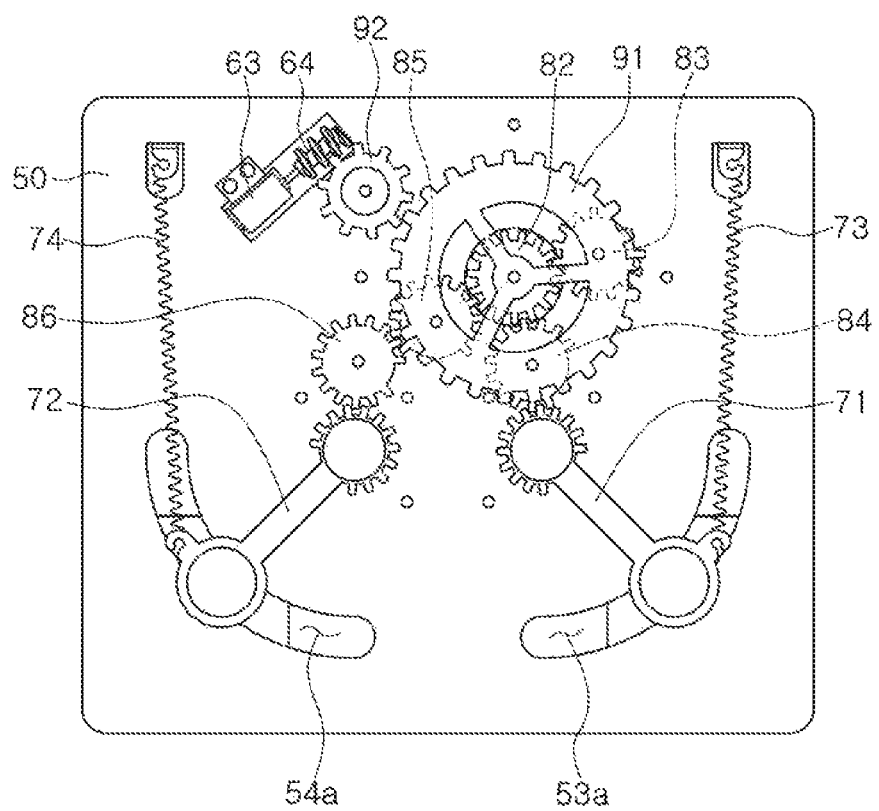
FIG. 25A is a bottom view illustrating a state in which a third camera and a fourth camera of a camera module are moved from an initial position to a moving position according to one or more embodiments.
Figure 25B:
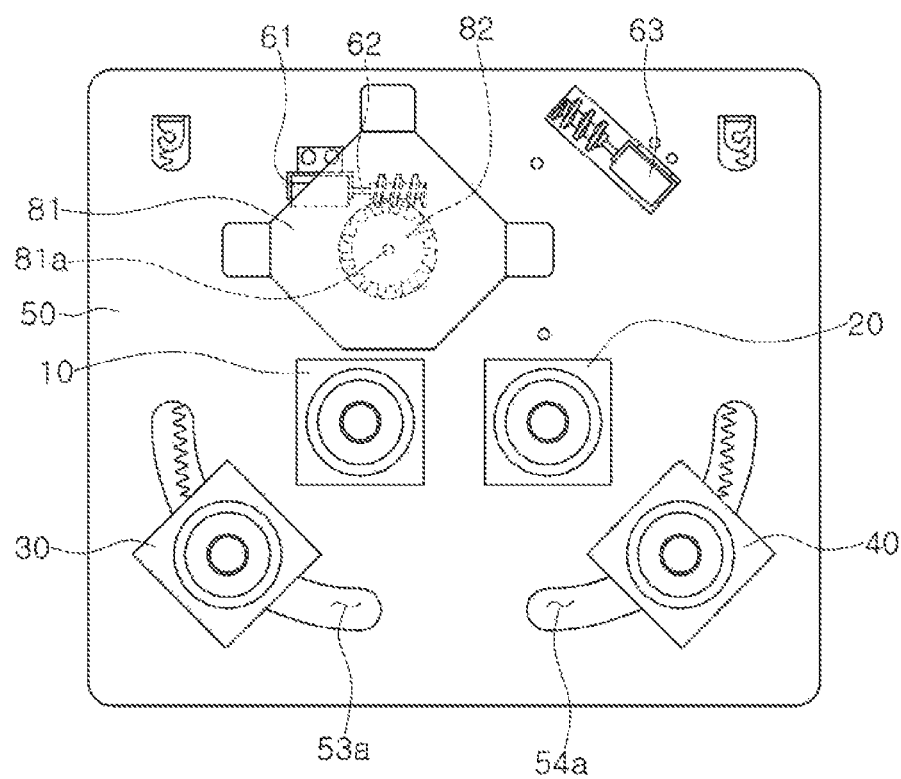
FIG. 25B is a plan view illustrating a state in which a third camera and a fourth camera of a camera module are moved from an initial position to a moving position according to one or more embodiments.

FIG. 25A is a bottom view illustrating a state in which a third camera and a fourth camera of a camera module are moved from an initial position to a moving position according to one or more embodiments. FIG. 25B is a plan view (a plan view of FIG. 25A, for example) according to one or more embodiments.

Figure 26A:
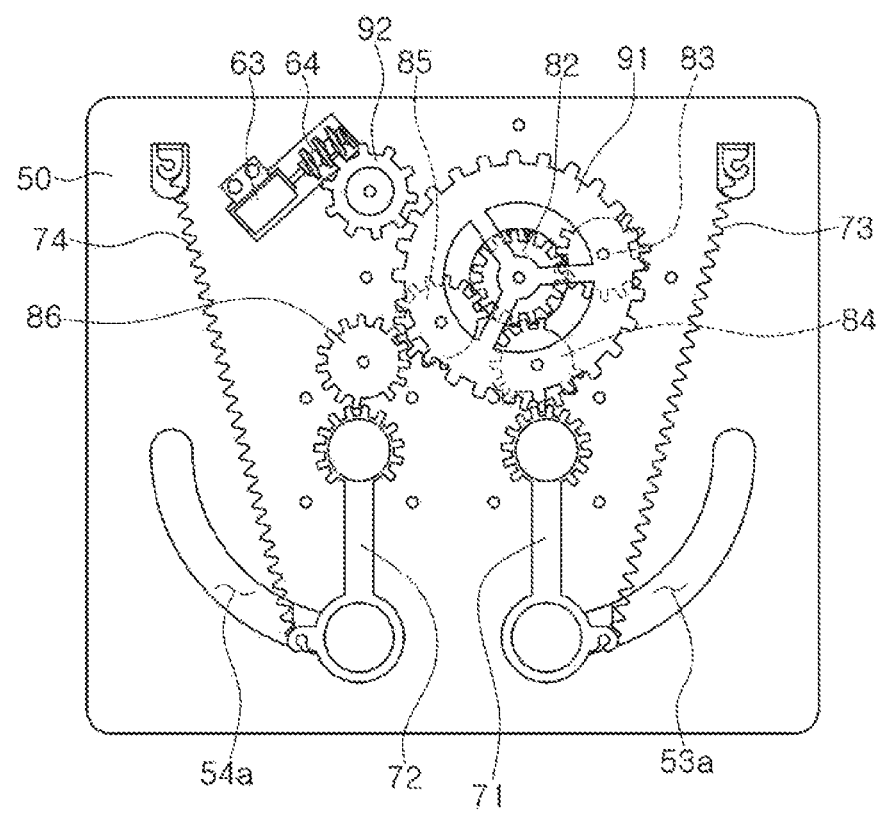
FIG. 26A is a bottom view illustrating a state in which a third camera and a fourth camera of a camera module are disposed in a moving position according to one or more embodiments.
Figure 26B:
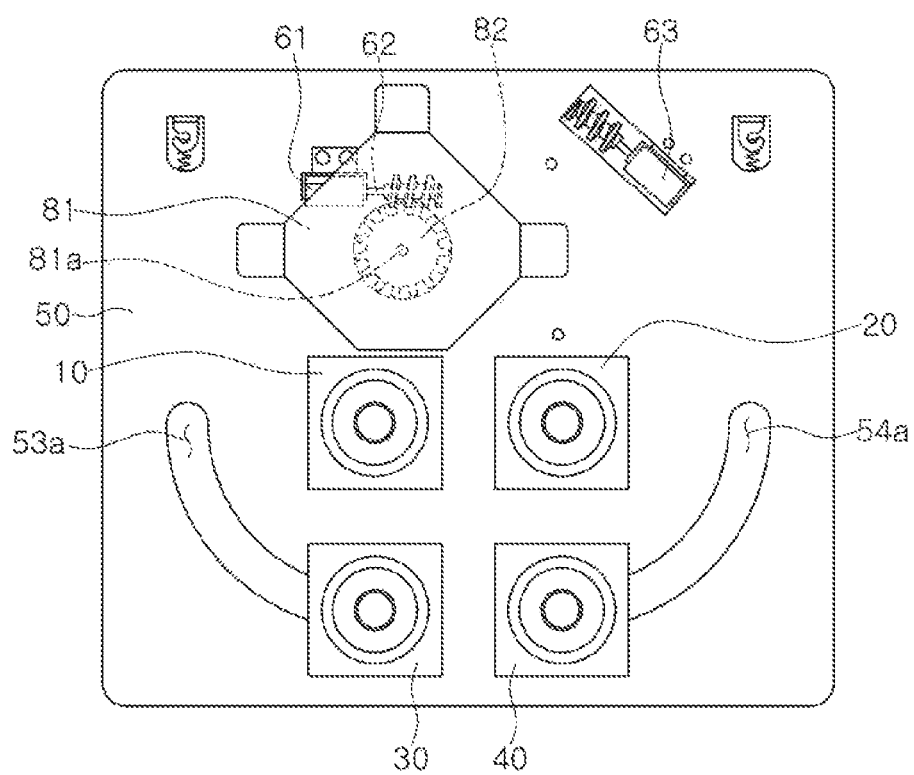
FIG. 26B is a plan view illustrating a state in which a third camera and a fourth camera of a camera module are disposed in a moving position according to one or more embodiments.

FIG. 26A is a bottom view illustrating a state in which a third camera and a fourth camera of a camera module are disposed in a moving position according to one or more embodiments. FIG. 26B is a plan view (a plan view of FIG. 26A, for example) according to one or more embodiments.

The example embodiments illustrated in FIGS. 24A to 26B may be different from the example embodiment illustrated in FIGS. 20A to 22B in that the example embodiments illustrated in FIGS. 24A to 26B do not include a first guide rail 53b, a first guide projection 33, a second guide rail 54b, and a second guide projection 43.

For example, the base plate 50 may include a first guide hole 53a and a second guide hole 54a, the third camera 30 may include a third protrusion 31 disposed in the first guide hole 53a, and the fourth camera 40 may include a fourth projection 41 disposed in the second guide hole 54a.

The third camera 30 may rotate and move along the first guide hole 53a, and the fourth camera 40 may rotate and move along the second guide hole 54a.

The third camera 30 may rotate with reference to the first camera 10 and may also rotate with reference to a center of the third camera 30 at the same time. In other words, the third camera 30 may rotate while revolving around the first camera 10.

The fourth camera 40 may rotate with reference to the second camera 20 and may also rotate with reference to a center of the fourth camera 40 at the same time. In other words, the fourth camera 40 may rotate while revolving around the second camera 20.

When the third camera 30 and the fourth camera 40 rotate while the third camera 30 and the fourth camera 40 rotate and move, arrangement of the image sensor of the third camera 30 and arrangement of the image sensor of the fourth camera 40 may be different in the initial position and the moving position.

For example, the long side of the image sensor of the third camera 30 in the initial position and the long side of the image sensor of the third camera 30 in the moving position may be perpendicular to each other. Also, the long side of the image sensor of the fourth camera 40 in the initial position and the long side of the image sensor of the fourth camera 40 in the moving position may be perpendicular to each other.

Figure 27:
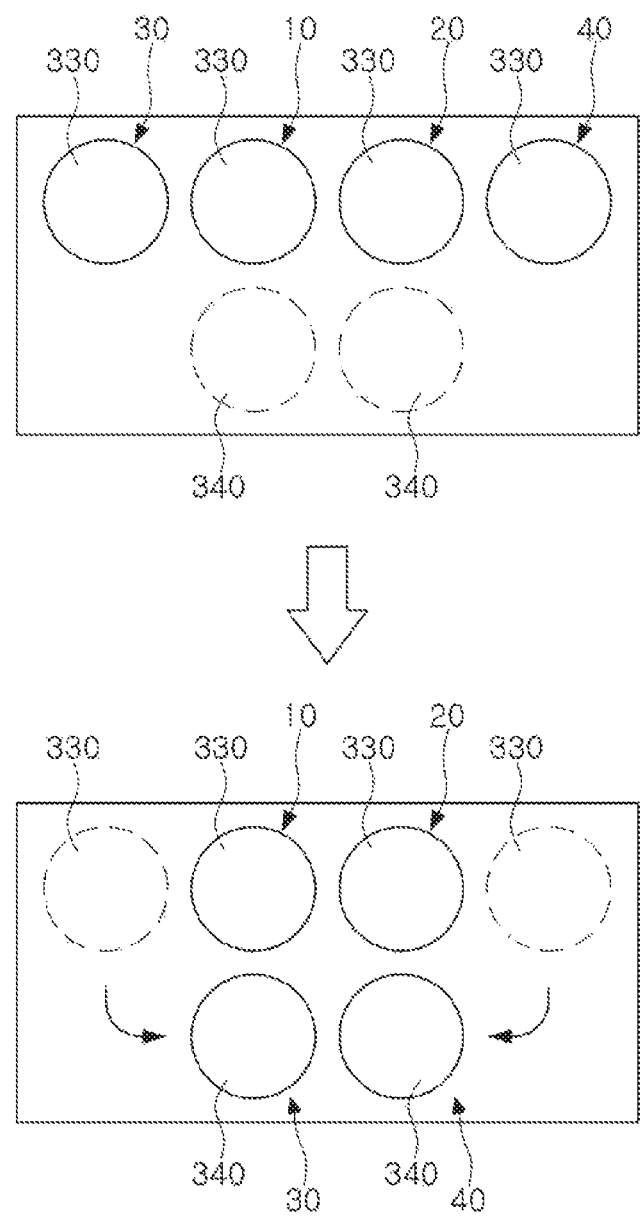
FIGS. 27 to 29 are views illustrating examples of an imaging method of a camera module according to one or more embodiments.
Figure 28:
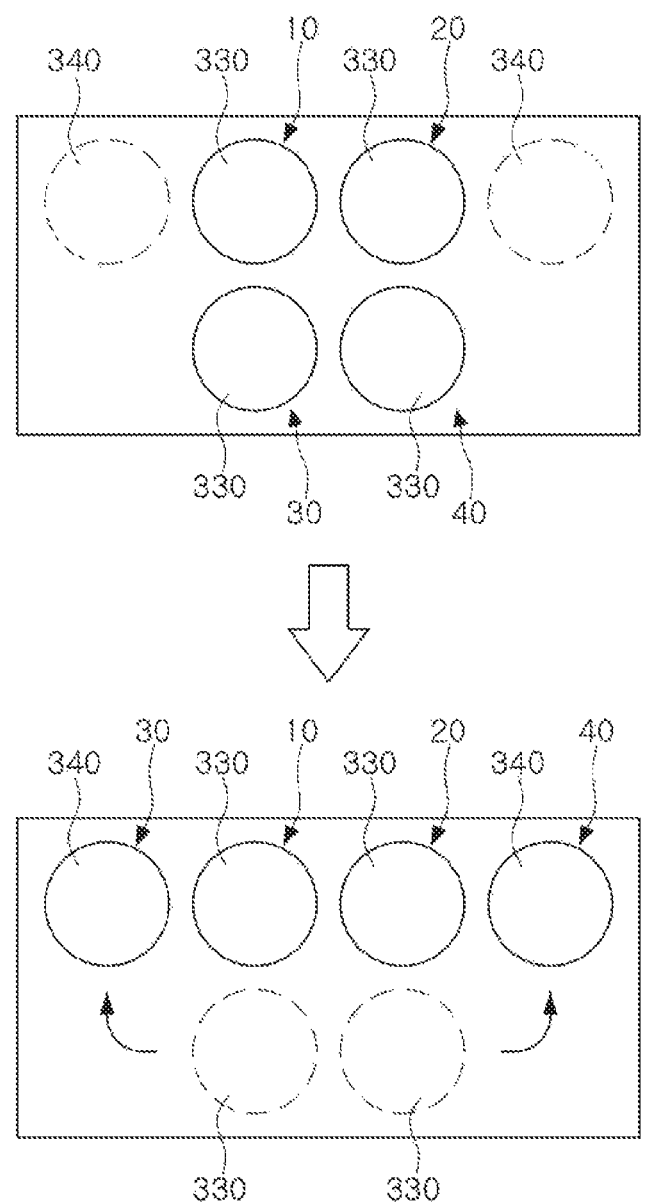
Figure 29:
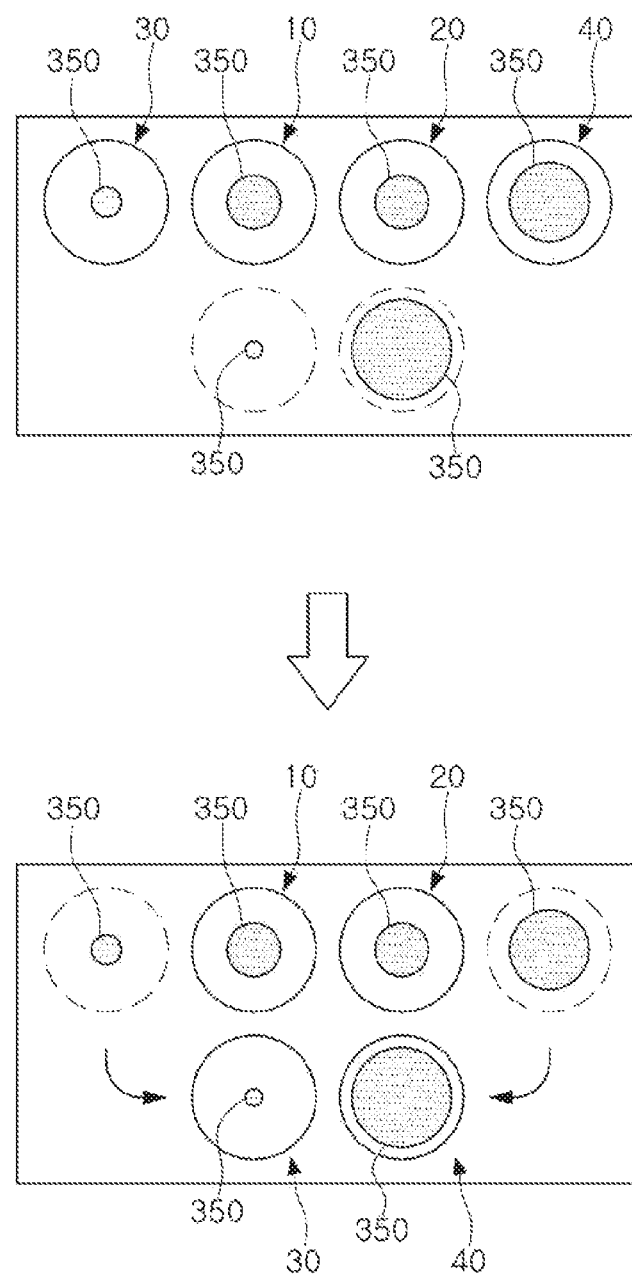

FIGS. 27 to 29 are views illustrating examples of an imaging method of a camera module according to one or more embodiments.

In FIGS. 27 to 29, the first camera 10, the second camera 20, the third camera 30, and the fourth camera 40 are schematically illustrated for ease of description.

Referring to FIG. 27, an upper view in FIG. 27 illustrates an example in which the first to fourth cameras 10 to 40 are disposed in an initial position, and a lower view in FIG. 27 illustrates an example in which the first camera 10 and the second camera 20 are disposed in the initial position, and the third camera 30 and the fourth camera 40 are disposed in the moving position.

The third camera 30 and the fourth camera 40 may be placed at any position between the initial position and the moving position according to an imaging method.

When the first to fourth cameras 10 to 40 are disposed in the initial position, a distance between the third camera 30 and the fourth camera 40 may be longer than when the third camera 30 and the fourth camera 40 are disposed in the moving position. Accordingly, a stereoscopic image may be obtained using the third camera 30 and the fourth camera 40 disposed in the initial position.

In the initial position, the first camera 10 and the second camera 20 may be used for general imaging (e.g., an image with infrared rays blocked). An infrared cut filter 330 may be provided in the cover glass 320 corresponding to the first to fourth cameras 10 to 40 in the initial position.

When the first camera 10 and the second camera 20 are disposed in the initial position, and the third camera 30 and the fourth camera 40 are disposed in the moving position, a distance between the third camera 30 and the fourth camera 40 may be shorter than when the third camera 30 and the fourth camera 40 are disposed in the initial position. Accordingly, the third camera 30 and the fourth camera 40, disposed in the moving position, may be used for general imaging.

Differently from, or in addition to, the above-described example, the third camera 30 and the fourth camera 40 may be used for infrared imaging (e.g., images that passed infrared rays). Accordingly, an infrared pass filter 340 may be provided in the cover glass 320 corresponding to the third camera 30 and the fourth camera 40 in the moving position Referring to FIG. 28, the first to fourth cameras 10 to 40 may be configured to have different fields of view. For example, the first camera 10 may have the widest field of view (wide angle), the second camera 20 may have a field of view narrower than the field of view of the first camera 10, and each of the third camera 30 and the fourth camera may have a field of view narrower than the field of view of the second camera 20. One of the third camera 30 and the fourth camera 40 may have a narrower field of view than the other.

In the initial position, the first camera 10 and the second camera 20 may be used for general imaging. In this case, a zooming effect may be implemented using the first camera 10 and the second camera 20.

For example, the first camera 10 may be used to image a subject in a wide range, and the second camera 20 may be used to image a subject in a narrower range.

Accordingly, a zooming effect may be substantially implemented by conversion between the first camera 10 and the second camera 20 in a range from wide angle to telephoto.

In the initial position, the third camera 30 and the fourth camera 40 may be used for infrared imaging. Accordingly, an infrared pass filter 340 may be provided in a cover glass 320 corresponding to the third camera 30 and the fourth camera 40 in the initial position.

An infrared cut filter 330 may be provided in the cover glass 320 corresponding to the third camera 30 and the fourth camera 40 in the moving position. Accordingly, the third camera 30 and the fourth camera 40 may be used for general imaging in the moving position.

In the moving position, the first to fourth cameras 10 to 40 may be disposed adjacent to each other. Since the first to fourth cameras 10 to 40 have different fields of view, an improved zooming effect may be implemented using the first to fourth cameras 10 to 40.

For example, the first camera 10 may be used to image a subject in the widest range, the second camera 20 may be used to image a subject in a narrow range, the third camera 30 may be used to image a subject in an even narrower range, and the fourth camera 40 may be used to image a subject in the narrowest range.

In other words, an improved zooming effect may be implemented by conversion among the first to fourth cameras 10 to 40 in a range from a wide angle to telephoto.

Referring to FIG. 29, a plurality of stops 350 may be disposed in the cover glass 320. For example, the stops 350 may have different diameters and may be provided in the cover glass 320 depending on different positions of the cameras.

In the initial position, the stops 350 corresponding to the first to fourth cameras 10 to 40 may have different diameters.

Also, in the moving position, diameters of the stops 350 corresponding to the third and fourth cameras 30 and 40 may be different from the diameters of the stops 350 in the initial position.

Accordingly, the cameras may have different F numbers depending on positions thereof.

In FIGS. 27 to 29, the infrared cut filter 330, the infrared pass filter 340, and the stops 350 may be provided in the cover glass 320, but an example embodiment thereof is not limited thereto. The infrared cut filter 330, the infrared pass filter 340, and the stops 350 may also be provided on the cover 300.

Each camera may be divided into a lens unit and an image sensor unit.

When the camera moves, one of the lens unit and the image sensor unit may move, and the other one of the lens unit and the image sensor unit may be disposed in the position in which the moving is completed such that the camera may have various fields of view depending on the different positions.

Also, a fingerprint sensor, a pulse sensor, and/or a light source may be fixed to and disposed in a region below the third camera 30 and the fourth camera 40.

Accordingly, when the third camera 30 and the fourth camera 40 move from the initial position to the moving position (or vice versa), an empty space may be used as a sensor for fingerprint and pulse recognition.

The imaging method of the camera module described in the aforementioned example embodiments is one of examples, and various combinations of the example embodiments may be available.

According to the aforementioned example embodiments, the camera module and the portable electronic device may selectively change positions of a portion of the plurality of cameras such that a subject may be imaged by various methods.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module device, comprising:
a base plate;
one or more cameras fixed to and disposed on one surface of the base plate;
a plurality of movable cameras movably disposed on the one surface of the base plate, the movable cameras being configured to move individually and collectively;
a driving gear disposed on the base plate; and
a plurality of sub-gears engaged with the driving gear,
wherein positions of the plurality of sub-gears are configured to change to selectively transfer power to one or more of the plurality of movable cameras.

2. The device of claim 1, wherein
the plurality of movable cameras are configured to move between an initial position and a moving position,
the initial position is a position in which centers of the one or more fixed cameras and the plurality of movable cameras are disposed linearly, and
the moving position is a position in which a line connecting the centers of the one or more fixed cameras and the plurality of movable cameras forms a triangular shape or a rectangular shape.

3. The device of claim 1, wherein
the one or more fixed cameras include a first camera and a second camera,
the plurality of movable cameras include a third camera and a fourth camera,
the third camera is connected to the first camera by a first link member and is configured to rotate,
the fourth camera is connected to the second camera by a second link member and is configured to rotate, and
a spur gear is engaged with the second link member.

4. The device of claim 3, wherein the third camera is configured to rotate about the first camera and the fourth camera is configured to rotate about the second camera.

5. The device of claim 3, further comprising a first moving gear rotatably provided on the base plate,
wherein
the plurality of sub-gears are mounted on the first moving gear,
the plurality of sub-gears include a first sub-gear, a second sub-gear, and a third sub-gear spaced apart from one another in a circumferential direction of the first moving gear, and
at least one of the first to third sub-gears is engaged with at least one of the first link member and the spur gear.

6. The device of claim 5, wherein
the first to third sub-gears are configured to move to a first position, a second position, and a third position,
in response to the first to third sub-gears being disposed in either one of the first position and the second position, one of the third camera and the fourth camera is configured to move, and
in response to the first to third sub-gears being disposed in the third position, both of the third camera and the fourth camera are configured to move.

7. The device of claim 6, wherein
the first position is a position in which the first sub-gear is disposed to be engaged with one side of the first link member,
the second position is a position in which the second sub-gear is disposed to be engaged with the spur gear, and
the third position is a position in which the second sub-gear is disposed to be engaged with the one side of the first link member and the third sub-gear is disposed to be engaged with the spur gear.

8. The device of claim 5, further comprising a first driver and a second driver provided on the base plate,
wherein
a rotating shaft of the first driver is engaged with the driving gear,
a rotating shaft of the second driver is engaged with a second moving gear, and
the second moving gear is engaged with the first moving gear.

9. The device of claim 8, further comprising a receiving hole penetrating and provided in the base plate,
wherein
the driving gear is disposed in the receiving hole to protrude to both sides of the receiving hole,
the driving gear protruding to one side of the receiving hole is engaged with the rotating shaft of the first driver, and
the driving gear protruding to another side of the receiving hole is engaged with the first to third sub-gears.

10. The device of claim 5, wherein each of the first to third sub-gears and the spur gear includes a sawtooth portion and an arc portion.

11. The device of claim 10, wherein the first to third sub-gears are configured to rotate to release an engaged state between the respective sawtooth portion and either of the first link member and the spur gear before positions of the first to third sub-gears move by the first moving gear.

12. The device of claim 3, wherein
the base plate includes a plurality of guide holes penetrating the base plate and each having a rounded shape, and
each of the third camera and the fourth camera include a protrusion disposed in a corresponding one of the guide holes.

13. The device of claim 12, wherein
the base plate includes a plurality of guide rails spaced apart from the plurality of guide holes and each having a rounded shape, and
each of the third camera and the fourth camera include a guide protrusion disposed in a corresponding one of the guide rails.

14. The device of claim 13, wherein curvatures of the plurality of guide holes are difference from curvatures of the plurality of guide rails.

15. The device of claim 3, further comprising:
a first elastic member connected to the first link member and configured to move the third camera from a moving position to an initial position in response to the transferred power being removed; and
a second elastic member connected to the second link member and configured to move the fourth camera from the moving position to the initial position in response to the transferred power being removed.

16. The device of claim 1, further comprising:
a case and a cover coupled to each other and forming an internal space; and
a module disposed in the internal space and comprising the base plate, the one or more fixed cameras, the plurality of movable cameras, the driving gear, and the plurality of sub-gears.

17. A portable electronic device, comprising:
a case and a cover coupled to each other and forming an internal space; and
a camera module disposed in the internal space, and comprising:
a base plate;

a first camera and a second camera fixed to and disposed on the base plate; and a third camera and a fourth camera disposed on the base plate and configured to move individually or collectively, wherein the base plate includes a driving gear, and a plurality of sub-gears engaged with the driving gear and configured to transfer power to either one or both of the third and fourth cameras, and wherein positions of the plurality of sub-gears are configured to change according to a camera to be moved among the third and fourth cameras.

18. The device of claim 17, further comprising:

an infrared cut filter provided on a portion of the cover corresponding to the first to fourth cameras in an initial position; and an infrared pass filter provided on a portion the cover corresponding to the third and fourth cameras in a moving position, wherein the initial position is a position in which centers of the first to fourth cameras are disposed linearly, and the moving position is a position in which a line connecting centers of adjacent cameras forms a triangular shape or a rectangular shape.

19. The device of claim 17, further comprising a plurality of stops are provided on the cover, wherein the plurality of stops correspond to the first to fourth cameras and have different diameters in an initial position, diameters of the plurality of stops corresponding to the third and fourth cameras in a moving position are different from the diameters of the plurality of stops in the initial position, and the initial position is a position in which centers of the first to fourth cameras are disposed linearly, and the moving position is a position in which a line connecting centers of adjacent cameras forms a triangular shape or a rectangular shape.

20. A camera module device, comprising:

a base plate;

a plurality of movable cameras disposed on the base plate, the movable cameras being configured to move individually and collectively; and a plurality of sub-gears configured to selectively transfer power to one or more of the movable cameras, based on positions of the sub-gears, wherein the movable cameras are configured to move from an initial position to a moving position, in response to receiving the transferred power.

* * * * *